United States Patent
Louis

(10) Patent No.: US 10,461,813 B2
(45) Date of Patent: Oct. 29, 2019

(54) INDUCTIVE POWER TRANSMITTER

(71) Applicant: Apple Inc., Cupertino, CA (US)

(72) Inventor: Jeffrey Douglas Louis, Auckland (NZ)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/141,869

(22) Filed: Sep. 25, 2018

(65) Prior Publication Data

US 2019/0028148 A1    Jan. 24, 2019

Related U.S. Application Data

(63) Continuation of application No. PCT/NZ2017/050038, filed on Apr. 4, 2017.

(60) Provisional application No. 62/475,813, filed on Mar. 23, 2017, provisional application No. 62/355,823, filed on Jun. 28, 2016, provisional application No. 62/318,133, filed on Apr. 4, 2016.

(51) Int. Cl.

| | |
|---|---|
| *H02J 50/10* | (2016.01) |
| *H02J 50/60* | (2016.01) |
| *H02J 50/80* | (2016.01) |
| *H04B 1/04* | (2006.01) |
| *H04L 27/12* | (2006.01) |
| *H04B 5/00* | (2006.01) |

(52) U.S. Cl.
CPC .......... *H04B 5/0037* (2013.01); *H02J 50/10* (2016.02); *H02J 50/60* (2016.02); *H02J 50/80* (2016.02); *H04B 1/04* (2013.01); *H04B 5/0075* (2013.01); *H04B 5/0081* (2013.01); *H04L 27/12* (2013.01)

(58) Field of Classification Search
CPC combination set(s) only.
See application file for complete search history.

(56) References Cited

U.S. PATENT DOCUMENTS

| | | |
|---|---|---|
| 4,960,983 A | 10/1990 | Inoue |
| 5,850,135 A | 12/1998 | Kuki et al. |
| 6,157,162 A | 12/2000 | Hayashi et al. |
| 6,219,267 B1 | 4/2001 | Andres |
| 9,735,626 B2 | 8/2017 | Hyodo |
| 2003/0214821 A1 | 11/2003 | Giannopoulos et al. |
| 2005/0068019 A1 | 3/2005 | Nakamara et al. |
| 2005/0116683 A1 | 6/2005 | Cheng et al. |
| 2007/0131505 A1 | 6/2007 | Kim |
| 2007/0182367 A1 | 9/2007 | Partovi |
| 2007/0228833 A1 | 10/2007 | Stevens et al. |
| 2009/0001932 A1 | 1/2009 | Kamijo et al. |

(Continued)

FOREIGN PATENT DOCUMENTS

| | | |
|---|---|---|
| CN | 1954472 A | 4/2007 |
| CN | 101375483 A | 2/2009 |

(Continued)

*Primary Examiner* — Ganiyu A Hanidu

(57) ABSTRACT

An inductive power transmitter comprising a transmission circuit having a coil, the transmission circuit tuned, adapted or optimised at or about a first frequency for inductive power transfer or object detection; an inverter operable to drive the transmission circuit at the first frequency; and a controller arranged to control the inverter to drive the transmission circuit at a second higher frequency, and to modulate a signal at the second higher frequency according to a predetermined handshake signal in order to generate a response from a predetermined non-authorised device proximate the coil.

18 Claims, 18 Drawing Sheets

(56) References Cited

U.S. PATENT DOCUMENTS

| | | |
|---|---|---|
| 2009/0033280 A1 | 2/2009 | Choi et al. |
| 2009/0174264 A1 | 7/2009 | Onishi et al. |
| 2009/0203345 A1* | 8/2009 | Sorrells .............. H03C 1/62 455/313 |
| 2011/0049997 A1 | 3/2011 | Urano |
| 2011/0089768 A1 | 4/2011 | Byrne et al. |
| 2011/0128015 A1 | 6/2011 | Dorairaj et al. |
| 2011/0128714 A1 | 6/2011 | Terao et al. |
| 2011/0196544 A1 | 8/2011 | Baarman et al. |
| 2013/0097078 A1* | 4/2013 | Wong ............... G06Q 20/027 705/44 |
| 2013/0127259 A1 | 5/2013 | Lohr et al. |
| 2013/0221913 A1 | 8/2013 | Kim |
| 2013/0263596 A1 | 10/2013 | Arisawa |
| 2014/0015329 A1 | 1/2014 | Widmer et al. |
| 2014/0084857 A1 | 3/2014 | Liu et al. |
| 2014/0009178 A1 | 4/2014 | Hyodo |
| 2014/0091634 A1 | 4/2014 | Mayo et al. |
| 2014/0111154 A1 | 4/2014 | Roy et al. |
| 2014/0191715 A1 | 7/2014 | Wechlin et al. |
| 2015/0054355 A1 | 2/2015 | Ben-Shalom et al. |
| 2015/0162785 A1* | 6/2015 | Lee .................. H02J 17/00 307/104 |
| 2015/0178532 A1* | 6/2015 | Brule ............... G06K 19/0717 340/5.61 |
| 2015/0182086 A1 | 7/2015 | Dimbylow et al. |
| 2015/0270719 A1* | 9/2015 | Kurs ................. H02J 5/005 320/108 |
| 2015/0285926 A1 | 10/2015 | Oettinger |
| 2015/0321567 A1 | 11/2015 | Czainski |
| 2016/0142174 A1* | 5/2016 | Fine .................. H04K 3/86 455/1 |
| 2016/0329755 A1* | 11/2016 | Park .................. H02J 7/025 |
| 2017/0117756 A1 | 4/2017 | Muratov |

FOREIGN PATENT DOCUMENTS

| | | |
|---|---|---|
| CN | 103782485 A | 5/2014 |
| EP | 2017940 A2 | 1/2009 |
| JP | H01157896 A | 6/1989 |
| JP | 2003263668 A | 9/2003 |
| JP | 2005345435 A | 12/2005 |
| JP | 2009112137 A | 5/2009 |
| JP | 2009118587 A | 5/2009 |
| JP | 2010239690 A | 10/2010 |
| JP | 2010538596 A | 12/2010 |
| JP | 2011193671 A | 9/2011 |
| JP | 2012175793 A | 9/2012 |
| JP | 2012533277 A | 12/2012 |
| JP | 2013542424 A | 11/2013 |
| JP | 2014027102 A | 2/2014 |
| JP | 2014126512 A | 7/2014 |
| JP | 2014526871 A | 10/2014 |
| JP | 2014222994 A | 11/2014 |
| JP | 2015046990 A | 3/2015 |
| JP | 2015136281 A | 7/2015 |
| KR | 10-20080094953 A | 10/2008 |
| WO | 8910030 A1 | 10/1989 |
| WO | 2009027674 A1 | 3/2009 |
| WO | 2009041058 A1 | 4/2009 |
| WO | 2013122483 A1 | 8/2013 |
| WO | 2013164831 A1 | 11/2013 |
| WO | 2013179394 A | 12/2013 |
| WO | 2014011776 A2 | 1/2014 |
| WO | 2014060871 A1 | 4/2014 |
| WO | 2014095722 A2 | 6/2014 |

\* cited by examiner

INDUCTIVE POWER TRANSMITTER

FIELD

This invention relates generally to an inductive power transmitter, particularly, but not exclusively, for an inductive power transfer system.

BACKGROUND

IPT systems are a well-known area of established technology (for example, wireless charging of electric toothbrushes) and developing technology (for example, wireless charging of handheld devices on a 'charging mat'). Typically, a power transmitter generates a time-varying magnetic field from a transmitting coil or coils. This magnetic field induces an alternating current in a suitable receiving coil in a power receiver that can then be used to charge a battery, or power a device or other load.

Regarding IPT systems for wireless charging of handheld devices in particular it is important that the wireless power is transferred to the receiver device only and not to so-called foreign objects, which can be defined as any object that is positioned on the charging mat (e.g., interface surface), but is not part of a receiver device. Typical examples of such foreign objects are parasitic elements containing metals such as coins, keys, paperclips, etc. For example if a parasitic metal is close to the active IPT area it could heat up during power transfer due to eddy currents that result from the oscillating magnetic field. In order to prevent the temperature of such parasitic metal from rising to unacceptable levels, the power transmitter should be able to discriminate between power receivers and foreign objects and timely abort the power transfer.

A conventional manner of detecting heating of foreign objects on an interface surface uses a power loss method. In this method the received power $P_{PR}$ is used to indicate the total amount of power that is dissipated within the power receiver contained in the handheld device due to the magnetic field produced by the power transmitter. The received power equals the power that is available from the output of the power receiver plus any power that is lost in producing that output power. The power receiver communicates its $P_{PR}$ to the power transmitter so that the power transmitter can determine whether the power loss is within acceptable set limits, and if not, the power transmitter determines anomalous behaviour which may indicate presence of a foreign object and aborts power transmission. However, this power loss accounting method does not in itself provide actual detection of a foreign object, only the occurrence of non-expected behaviour.

International patent publication number WO2014/095722, by contrast, proposes a method of foreign object detection which uses excitation and detection coils within the transmitter, separate from the primary IPT transmitter coil(s). In that case either changes in the output voltage in the detection winding, or changes in the inductance of the detection winding are used to determine possible presence of an object. However this system requires a complex calibration to determine the base inductance. It is also insensitive to metal objects versus ferrous or magnetic objects, and therefore does not provide a means to discriminate between foreign objects and friendly objects, e.g., a receiver device. Any undesirable effects of operation of the primary IPT field on the detection is also not considered or characterised, such that the proposed method may be unreliable.

SUMMARY

It is an object of the invention to provide an improved inductive power transmitter or provide the public with a useful choice.

According to one example embodiment there is provided an inductive power transmitter comprising:
  a transmission circuit having a coil, the transmission circuit tuned, adapted or optimised at or about a first frequency for inductive power transfer or object detection;
  an inverter operable to drive the transmission circuit at the first frequency; and
  a controller arranged to control the inverter to drive the transmission circuit at a second higher frequency, and to modulate a signal at the second higher frequency according to a predetermined handshake signal in order to generate a response from a predetermined non-authorised device proximate the coil.

According to a second example embodiment there is provided an inductive power transmitter comprising:
  a transmission circuit having a coil;
  an inverter operable to drive the transmission circuit; and
  a controller arranged to control the inverter to drive the transmission circuit at a first handshake frequency, and to modulate a signal at the first handshake frequency according to a predetermined handshake signal in order to generate a response from a predetermined non-authorised devices proximate the coil,
  wherein the predetermined non-authorised device has a specified handshake signal having a carrier frequency higher than the first handshake frequency, and
  wherein the predetermined handshake signal includes a sequential series of polling commands and the specified handshake signal includes a sequential series of polling commands, and the number of cycles of each predetermined handshake signal polling command is the same as the number of cycles of each respective specified handshake signal polling command.

According to a third example embodiment there is provided an inductive power receiver comprising:
  a receiver circuit having a coil;
  an non-authorised resonant device; and
  a controller arranged to detect a disable signal in the coil sent by an inductive power transmitter, to disable the non-authorised resonant device depending on the disable signal, and to modulate a signal in the coil to instruct the transmitter to begin power transfer.

According to a forth example embodiment there is provided an inductive power transmitter comprising:
  a transmitter circuit having a coil;
  an inverter operable to drive the transmission circuit; and
  a controller arranged to control the inverter to drive the transmission circuit at a first ping frequency, and to modulate a signal at the first ping frequency according a disable signal to disable a non-authorised resonant device in an authorised receiver, and to detect a start-up signal in the coil to begin power transfer to the authorised receiver.

According to a fifth example embodiment there is provided an inductive power transmitter comprising:
  at least one multi purpose coil; and
  an object detection system configured to detect objects in or adjacent to the IPT field;

wherein the object detection system energises the multi purpose coil to send a handshake signal configured to generate a response from a predetermined non-authorized object, and detects a non-authorized object based on receiving a valid response.

According to a sixth example embodiment there is provided an object detection system for an inductive power transmitter, the object detection system comprising:
memory arranged to store predetermined signatures associated with an authorized inductive power receiver and/or a non-authorized object;
the object detection system arranged to indicate a non-authorized objects in response to:
detecting one or more of the predetermined signatures associated with the non-authorized objects;
and/or detecting a signature which does not correspond to the predetermined signatures associated with an authorized receiver.

According to a seventh example embodiment there is provided an inductive power transmitter comprising:
at least one power transmitting coil configured to generate an inductive power transfer (IPT) field; and
an object detection system configured to detect objects in or adjacent to the IPT field;
wherein the object detection system is configured to detect a non approved resonant device.

According to a eighth example embodiment there is provided an object detection system for an inductive power transmitter, the object detection system comprising:
a coil and circuitry arranged to determine reflected impedances at a plurality of frequencies;
memory arranged to store predetermined frequencies associated with an authorized inductive power receiver and/or predetermined frequencies associated with a non-authorized receiver; and
the object detection system arranged to indicate a non-authorized receiver in response to:
detecting a predetermined increase or decrease in reflected impedance at the predetermined frequency associated with the non-authorized receiver;
and/or detecting a predetermined increase in reflected impedance at a frequency which is not associated with the authorized inductive power receiver.

According to a ninth example embodiment there is provided a method of operating an object detection system for an inductive power transmitter, the object detection system comprising a coil and circuitry, the method comprising:
driving the coil at a first power level and determining a first reflected impedance;
driving the coil at a second higher power level and determining a second reflected impedance;
wherein the second power level but not the first power level is sufficient to start operation of a predetermined non-authorised receiver;
detecting a non-authorised receiver in response to determine a predetermined difference between the first and second reflected impendences.

According to a tenth example embodiment there is provided a method of operating an object detection system for an inductive power transmitter, the method comprising:
determining reflected impedances at a plurality of frequencies;
indicating a non-authorized receiver in response to:
detecting a predetermined increase or decrease in reflected impedance at a predetermined frequency associated with a non-authorized receiver;
and/or detecting a predetermined increase in reflected impedance at a frequency which is not associated with an authorized inductive power receiver.

According to a eleventh example embodiment there is provided a inductive power transmitter comprising:
a transmission circuit having a coil, the transmission circuit tuned to a first frequency for inductive power transfer or object detection;
an inverter operable to drive the transmission circuit at the first frequency;
a controller arranged to control the inverter to drive the transmission circuit at a second higher frequency, and to modulate the second higher frequency according to a predetermined handshake signal in order to generate a response from a predetermined non-authorised devices proximate the coil.

According to an twelfth example embodiment there is provided a method of operating an inductive power transmitter comprising a transmission circuit including a coil and tuned to a first frequency, and an inverter operable to drive the transmission circuit at the first frequency; the method comprising:
driving the transmission circuit at a second higher frequency in order to detect any predetermined non-authorised devices proximate the coil;
modulating the second higher frequency according to a predetermined handshake signal recognisable by the non-authorised devices; and
indicating the presence of the non-authorised device in response to detecting a predetermined response.

According to a thirteenth example embodiment there is provided an inductive power transmitter comprising:
a transmission circuit having a coil;
an inverter operable to drive the transmission circuit;
a controller arranged to control the inverter to drive the transmission circuit at a first handshake frequency, and to modulate a signal at the first handshake frequency according to a predetermined handshake signal in order to generate a response from a predetermined non-authorised devices proximate the coil,
wherein the predetermined non-authorised device has a specified handshake signal having a carrier frequency higher than the first handshake frequency, and
wherein the predetermined handshake signal includes a sequential series of modulation states and the specified handshake signal includes a sequential series of modulation states, and the number of cycles of each predetermined handshake signal series of modulation states is the same as the number of cycles of each respective specified handshake signal series of modulation states.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION

Figure 1:
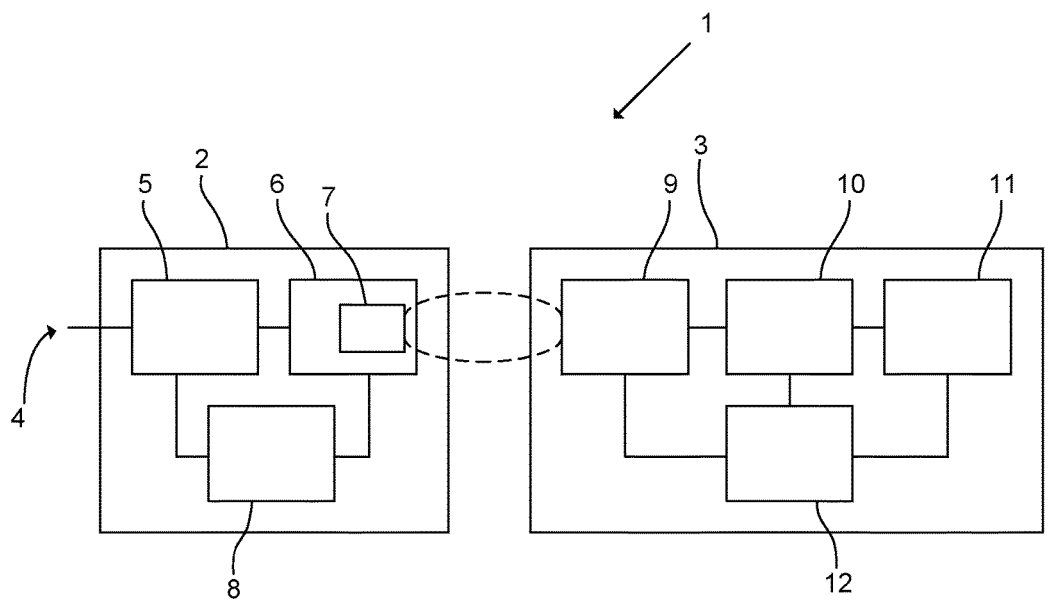
FIG. 1 is a schematic diagram of an inductive power transfer system.

An inductive power transfer (IPT) system 1 is shown generally in FIG. 1. The IPT system includes an inductive power transmitter 2 and an inductive power receiver 3. The inductive power transmitter 2 is connected to an appropriate power supply 4 (such as mains power or a battery). The inductive power transmitter 2 may include transmitter circuitry having one or more of a converter 5, e.g., an AC-DC converter (depending on the type of power supply used) and an inverter 6, e.g., connected to the converter 5 (if present). The inverter 6 supplies a transmitting coil or coils 7 with an AC signal so that the transmitting coil or coils 7 generate an alternating magnetic field. In some configurations, the transmitting coil(s) 7 may also be considered to be separate from the inverter 5. The transmitting coil or coils 7 may be connected to capacitors (not shown) either in parallel or series to create a resonant circuit.

A controller 8 may be connected to each part of the inductive power transmitter 2. The controller 8 receives inputs from each part of the inductive power transmitter 2 and produces outputs that control the operation of each part. The controller 8 may be implemented as a single unit or separate units, configured to control various aspects of the inductive power transmitter 2 depending on its capabilities, including for example: power flow, tuning, selectively energising transmitting coils, inductive power receiver detection and/or communications. The controller 8 may internally include memory for storing measured and calculated data or may be connected to external memory for such purpose.

The inductive power receiver 3 includes a receiving coil or coils 9 connected to receiver circuitry which may include power conditioning circuitry 10 that in turn supplies power to a load 11. When the coils of the inductive power transmitter 2 and the inductive power receiver 3 are suitably coupled, the alternating magnetic field generated by the transmitting coil or coils 7 induces an alternating current in the receiving coil or coils 9. The power conditioning circuitry 10 is configured to convert the induced current into a form that is appropriate for the load 11, and may include for example a power rectifier, a power regulation circuit, or a combination of both. The receiving coil or coils 9 may be connected to capacitors (not shown) either in parallel or series to create a resonant circuit. In some inductive power receivers, the receiver may include a controller 12 which may control tuning of the receiving coil or coils 9, operation of the power conditioning circuitry 10 and/or communications.

The term "coil" may include an electrically conductive structure where an electrical current generates a magnetic field. For example inductive "coils" may be electrically conductive wire in three dimensional shapes or two dimensional planar shapes, electrically conductive material fabricated using printed circuit board (PCB) techniques into three dimensional shapes over plural PCB 'layers', and other coil-like shapes. The use of the term "coil", in either singular or plural, is not meant to be restrictive in this sense. Other configurations may be used depending on the application.

Figure 2:
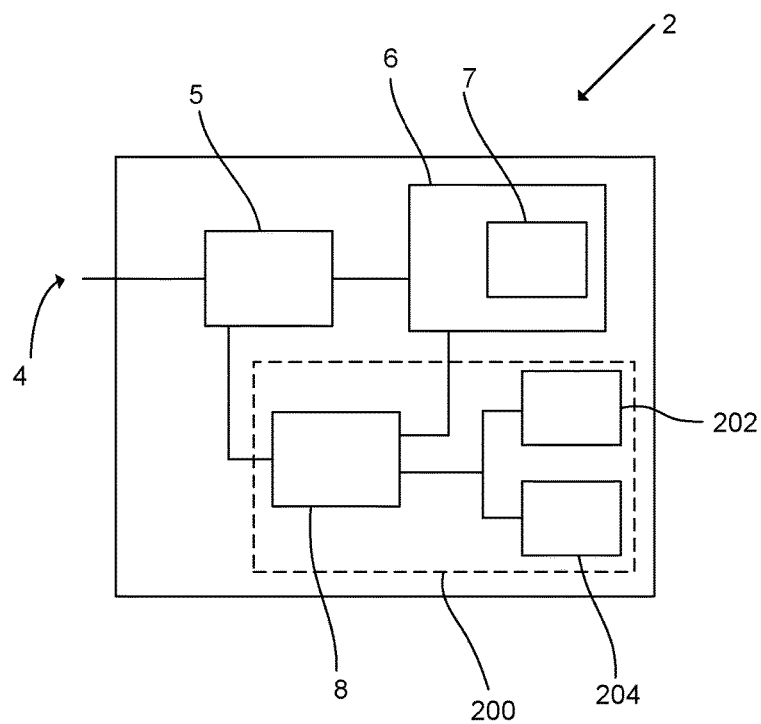
FIG. 2 is a block diagram of an object detection system.

An example transmitter 2 is shown in FIG. 2. The inverter 6 supplies power to the transmitting coil 7 to generate an IPT field. An object detection (OD) circuit 200 includes an excitation coil or coils 202 to generate a detection (OD) field separate from the IPT field and a detection coil or coils 204 used to sense the presence and/or location of objects on or adjacent to the transmitter 2. The controller 8 of the transmitter 2 may either directly or via a separate control circuit be configured to determine the excitation to be provided to the excitation coil 202 and process the output signal from the detection coil 204.

This may involve a single excitation coil and an array of detection coils, an array of excitation coils and a single detection coil, an array of excitation coils and an array of detection coils, using a single coil for both excitation and detection, and/or using the IPT coil(s) as the excitation coil(s) (and either using the IPT frequency or modulating an excitation signal onto the IPT field) depending on the requirements of the application.

In an embodiment the detection technique may be considered a form of magnetic vision system, which works by transmission of an excitation signal to a power receiver (or other conducting object in the detection field) which is then scattered back to an array of sensors which are monitored either continuously or periodically. The strength and delay of the backscatter of the excitation signal is measured and may be separately analysed at each location across the array. This can then be used to detect objects (both friendly and foreign) and track the position and/or movement of such objects, such as multiple receivers, in the IPT field or on the transmitter surface. It may also be able to detect foreign objects which are overlapping with the friendly objects, such as the receiving coil(s) of a power receiver.

The detection array is structured such that its resolution is sufficient for significant foreign objects to be sensed or "seen" and located, with sufficient aperture to be able to identify the presence and location of one or more phones or perhaps a tablet or a portable PC or other portable rechargeable equipment.

One or more embodiments may rely on directly or indirectly determining the transfer of energy (either to an object or between the excitation coil and the detector coil) rather than a reflection. In other words the coupling coefficient between the excitation coil, the object and/or the detector coil is used to determine the nature and/or location of the object e.g.: foreign (or friendly).

Decoupling from the IPT Field

The OD field is used for detection of objects whereas the IPT filed is used to wirelessly transfer meaningful levels of power between electronic devices. Accordingly, the power of the IPT field is several orders of magnitude higher than the OD field, such that in order to effectively operate the object detection apparatus during power transfer it may be desirable to substantially decouple the OD field from the IPT field. A number of ways of achieving such decoupling are now described. In this way, any undesirable effects of operation of the IPT field on the detection are minimised, thereby making the detection method of the present invention more reliable and robust.

The OD field can be a produced so as to have a significantly higher or lower frequency than that used for the IPT field. This may allow frequency isolation from the IPT field as well as increasing the sensitivity of physically small objects, such as coinage, due to the possibility of resonance being set up in the object. For a common application of IPT, where the IPT field has an operating frequency is about 110 kHz to about 205 kHz, a OD field frequency that is higher in the MHz region, such as about 1 MHz or that is lower in the kHz region, such as about 5 kHz may be used. Such frequencies may also provide enhanced sensitivity for certain types of foreign objects. In this way the OD field is frequency decoupled from the IPT field.

Accordingly, in one embodiment the driving of the OD field is configured so that one OD field frequency is used for object detection where this frequency is lower or higher than the IPT field frequency, e.g., about 5 kHz or about 1 MHz. In an alternative embodiment driving of the OD field is configured so that a range of OD field frequencies are used, using so-called frequency "hopping" or "sweeping". Several different frequencies may be used about the exemplary levels already described at which measurements for object detection are made. For example, for OD field frequencies higher than the IPT field frequency measurements may be taken at each of about 800 kHz, about 1 MHz and about 1.2 MHz, and for OD field frequencies lower than the IPT field frequency measurements may be taken at each of about 1 kHz, about 5 kHz and about 10 kHz. This frequency hopping advantageously provides the ability to increase discrimination between foreign and friendly objects. For example, for power receivers having the receiver coil(s) as part of a resonant circuit and non-resonant objects, e.g., metal or ferrite, may provide similar response to the OD field at a particular OD field frequency. This may occur due to the selected OD field frequency being a harmonic of the IPT field frequency, for example. However, such resonant receivers will provide a different response at different OD field frequencies whilst the response of non-resonant objects is substantially independent of frequency.

The excitation coil(s) 202 and/or the detection coil(s) 204 (collectively referred to as OD coils) may be arranged to approximately encompass a positive IPT flux and an equivalent negative IPT flux. In this way the OD field is substantially magnetically decoupled from the IPT field. This may be achieved in a number of ways. For example counterwound (i.e., clockwise and counter-clockwise) OD coils may be used in symmetrical locations within the or each IPT transmitter coil (i.e., encompassed within the dimensions or 'footprint' of one transmitting coil above or below that coil with respect to the horizontal plane of that coil) with equal flux in each counter-wound OD coil. In a further example portions of each OD coil may be inside and outside of the IPT transmitter coil. In a still further example counterwound OD coils may be used in asymmetrical portions of the IPT field produced by one or more transmitter coils with different numbers of turns (i.e., in a clockwise wound portion vs. a counter clockwise wound portion).

Figure 3:
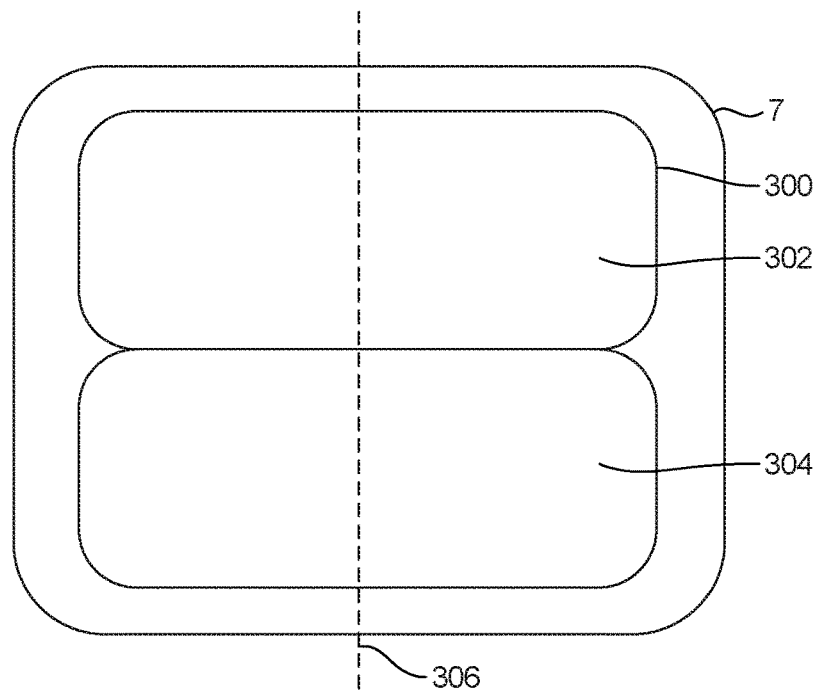
FIG. 3 is a schematic diagram of a double OD coil.

FIG. 3 shows an example of a double excitation/detection coil 300. The coil 300 has a clockwise wound portion 302 and a counter clockwise portion 304. The coil 300 is located wholly within one IPT transmitter coil 7 with the clockwise and counter-clockwise portions 302,304 positioned on either side of a line of symmetry 306 through the transmitter coil 7 so that equal amounts of IPT flux passes through each portion 302,304. In this example embodiment, the oppositely-wound portions 302,304 may be formed as separate windings that are coupled to one another in a manner understood by those skilled in the art or as a single winding wound in a (substantially symmetrical) "FIG. 8" configuration.

Figure 4:
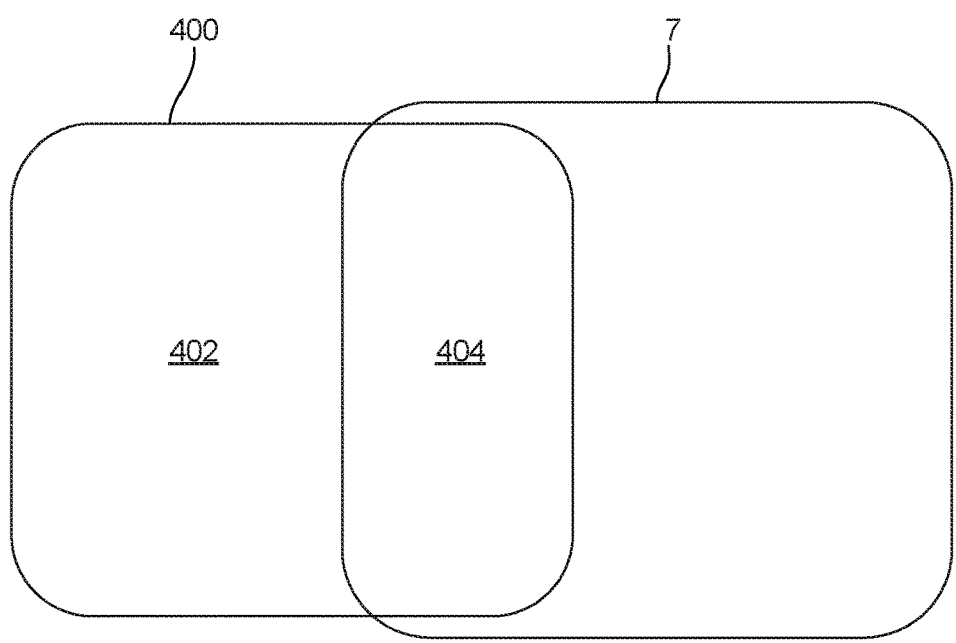
FIG. 4 is a schematic diagram of a single OD coil.

FIG. 4 shows an example of a single excitation/detection coil 400. The coil 400 has an outside (first) portion 402 and an inside (second) portion 404, with respect to one IPT transmitter coil 7. That is, coil 400 is arranged to overlap the transmitter coil 7 so that the outside portion 402 is arranged exterior to the IPT transmitter coil 7 whereas the inside portion 404 is arranged interior of the IPT transmitter coil 7, such that with equal amounts of (opposite) IPT flux passes through each portion 402,404.

Figure 5:
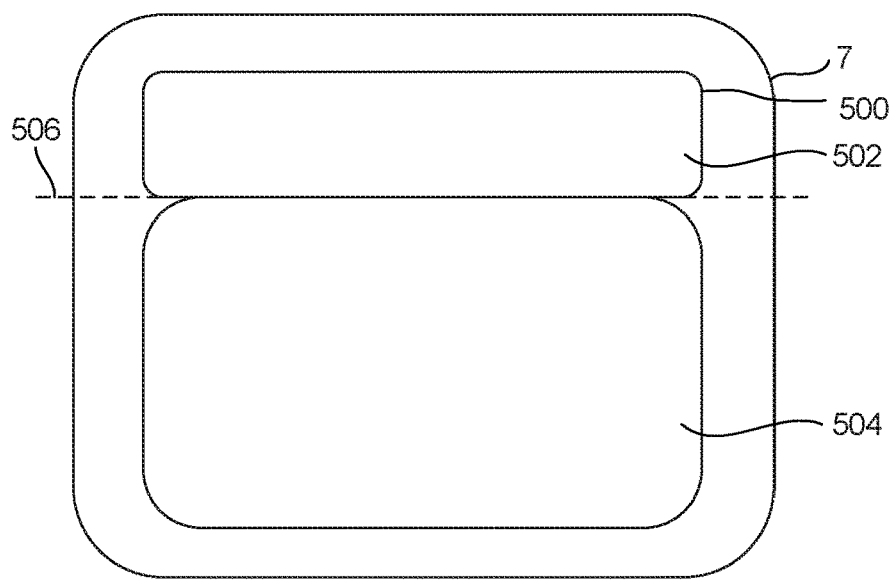
FIG. 5 is a schematic diagram of another double OD coil.

FIG. 5 shows an example of another double excitation/detection coil 500. The coil 500 has a clockwise wound portion 502 and a counter clockwise portion 504. The coil 500 is located wholly within one IPT transmitter coil 7 with the clockwise and counter-clockwise portions 502,504 positioned on either side of a line of asymmetry 506 through the transmitter coil 7 so that different amounts IPT flux passes through each portion 502,504. In this example, the IPT flux through the oppositely-wound portions 502,504 may be balanced by using an imbalanced number of turns in each portion 502,504 calculated to substantially compensate for the IPT flux imbalance or an imbalanced impedance by configuring the relative size (e.g., thickness, diameter, etc.) or conductivity (e.g., by using different conductive materials) of the coil portion windings 502,504 calculated to substantially compensate for the IPT flux imbalance. Like the example of FIG. 3, the oppositely-wound portions 502, 504 may be formed as separate windings that are coupled to one another or as a single winding wound in a (substantially asymmetrical or skewed) "FIG. 8" configuration.

Other forms of decoupling may be used depending on the application. It is noted that in embodiments where one or more excitation coils separate from the transmitter coil(s) are used for generating the detection field, it is the excitation coils that are wound in the flux-cancelling manner described above, whereas in embodiments where one or more transmitter coils are used for generating the detection field, it is the detection coils that are wound in the flux-cancelling manner described above in order to provide decoupling from an IPT filed being generated from other transmitter coils in a transmitter coil array, for example.

Layout of Excitation and Detection Coils

In order to increase the sensitivity and/or decrease the manufacturing costs, several features in the OD coils may be provided.

Figure 6:
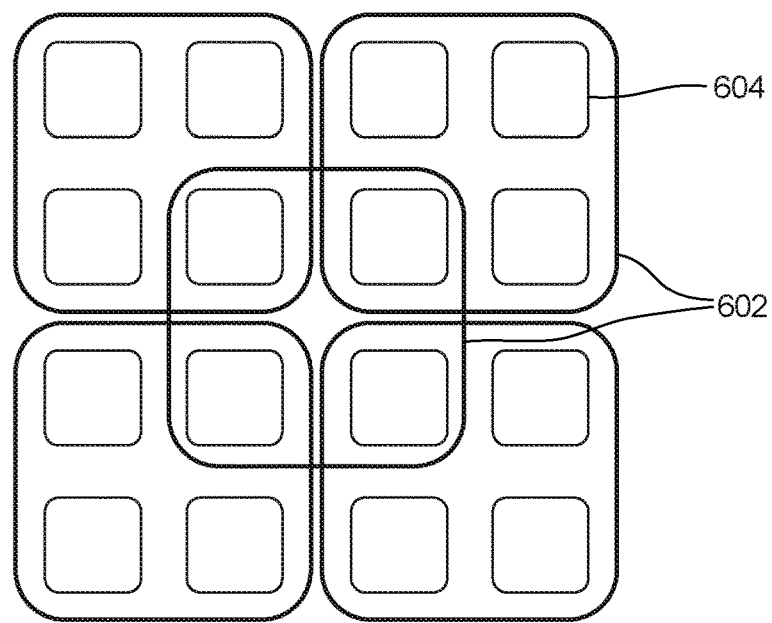
FIG. 6 is a schematic diagram of a transmission coil layout.

An example of an array of the transmitting coils is shown in FIG. 6. Each transmitting or IPT coil 602 is provided around a number of systematically arranged IPT ferrite elements (cores) 604. The IPT coils 602 are arranged in a rectangular array structure and may be linear (2D), overlapping (as in FIG. 6) or 3 dimensionally (3D) arranged. The coil and array itself may be arranged to have a different geometrical or arbitrary shape. The (array of) ferrite cores are used to enhance the IPT field generated by the IPT coils 602 in a manner understood by those skilled in the art and may be arranged and dimensioned relative to the transmitter coil array as described in U.S. Provisional Patent Application No. 62/070,042 entitled System and Method for Power Transfer and filed Aug. 12, 2014, the entire contents of which are expressly incorporated herein by reference, so that the upper surface (relative to the z-axis of the IPT system which is orthogonal to the plane of the transmitter coils; along which the so-called "z-height" is defined as the distance between the transmitting and receiving coils of the IPT system) of each ferrite element protrudes from the IPT coils 602 or may be configured so that the upper surface of the ferrite elements are co-planar with, or beneath, the upmost plane of the transmitting coils surface. The ferrite elements may have a substantially flat or rounded upper surface. As described below, if such ferrite elements are present for the IPT array, they may also be advantageously used for the detection field.

Figure 7:
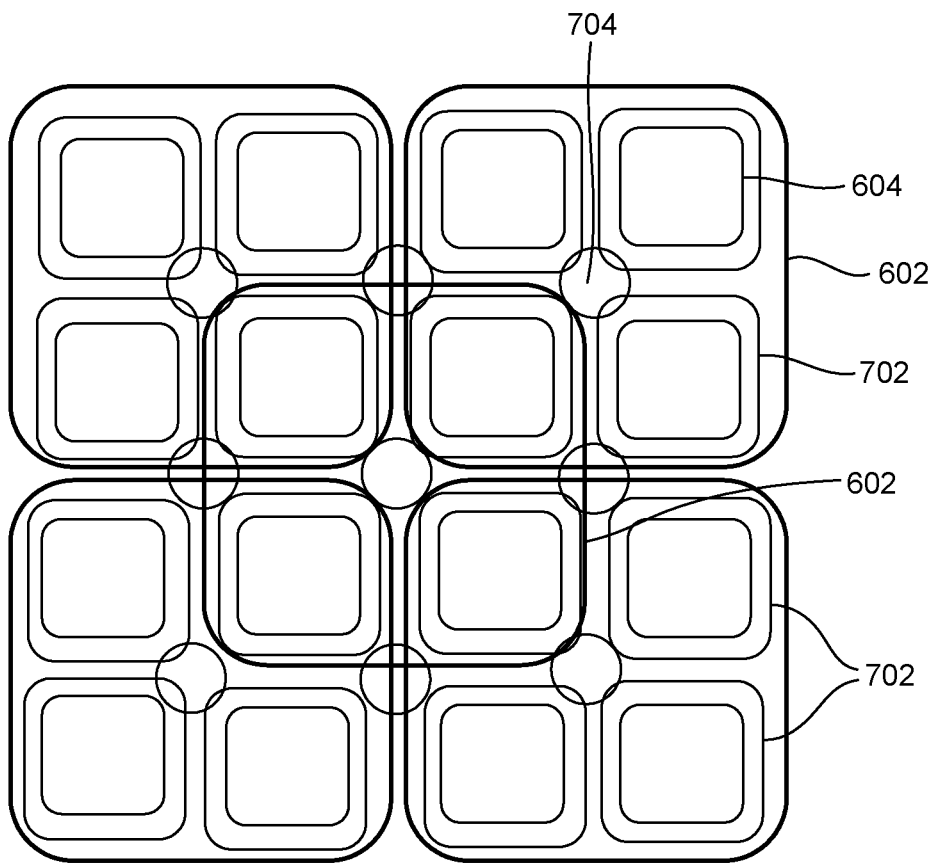
FIG. 7 is a schematic diagram showing the OD and IPT coils interleaved around the ferrites.

FIG. 7 shows the array of IPT coils 602 of FIG. 6 interleaved with an array of detection coils 702 in an example configuration. Each IPT coil 602 encompasses four of the ferrite cores 604. Each of the detection coils 702 is arranged above the upper surface of one of the ferrite cores 604 (i.e., in a plane which is parallel to, but elevated from, the plane of the upper surface of the ferrite element) so that the single ferrite core is surrounded by or enclosed within the respective detection coil, as seen in the aspect of FIG. 7. By this arrangement, the ferrite material of the core 604 allows the detection coil 702 to be more sensitive through enhancement of the OD field, similar to the effects in the IPT field. However, since the ferrite cores 604 concentrate the magnetic flux of the IPT field at the positions of the cores, the IPT flux in the spaces between the cores is correspondingly less dense. Accordingly, some areas may form IPT field nulls 704 with low, but non-zero, IPT flux. Similarly the sensitivity of the detection coils 702 also degrades between the ferrite cores 604. Thus the alignment of the IPT field nulls 704 and the lower sensitivity OD field regions may be desirable, as any foreign object present wholly at these points will similarly not be receiving IPT flux thereby reducing the risk of heating.

The excitation coil 202 may similarly be interleaved with the transmitting coils 7, and the ferrite elements 604 may be used to increase the OD field strength produced by the excitation coil array depending on the application requirements.

Figure 8:
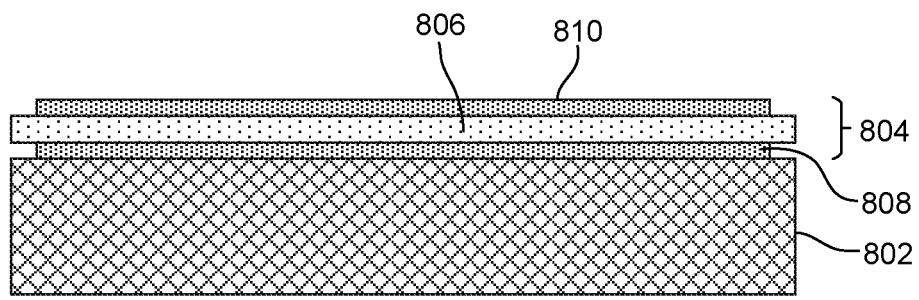
FIG. 8 is a cross section of a PCB based OD coil.

FIG. 8 shows the OD coil array constructed as a printed circuit board (PCB). A base layer 802 of a PCB 804 may have the array of transmitting coils and ferrite elements. The PCB 804 may include a substrate layer 806, with two copper trace layers 808 and 801 on either side. The underside trace 808 (facing the base layer 802) may include the excitation coils 202. The upper trace 810 may include the detection coils 204. In this way the size of the OD coil array can be minimised.

Figure 9:
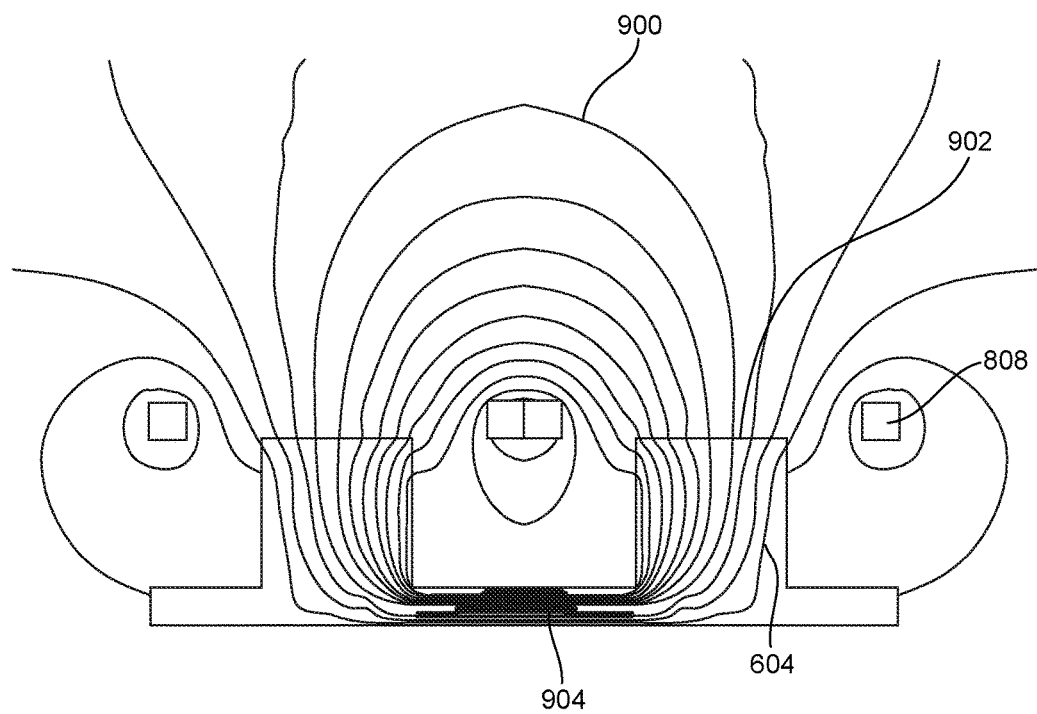
FIG. 9 is a simulation of the flux lines generated by the excitation coil using the IPT ferrites.

FIG. 9 shows an example field distribution 900, for the underside trace 808 in FIG. 8 where the excitation coils are arranged to surround each ferrite element 604 (in the manner discussed earlier with respect to the detection coils). The detection and/or excitation coils use the ferrite structure of the IPT transmitter coil array as described above and the field lines concentrate at the poles 902 of each ferrite element 604. In this embodiment, the ferrite elements 604 (and therefore the PCB 804) is provided on a base or substrate (back-plate) 904 also of ferrite. The base plate 904 therefore acts as shield for the undersides (with respect to the dimensional planes described earlier) of the IPT and OD coil arrays so that any metal objects underneath the coil arrays are not heated or erroneously detected. In this way, the OD circuit 200 is directional.

In this embodiment, the ferrite elements may be separate elements applied to the ferrite back-plate or integral with the back-plate through suitable manufacture. The OD coils may alternatively incorporate separate ferrite elements/cores to increase sensitivity of detection depending on the application, e.g., where the IPT coils array does not employ such elements.

Detection HW and Algorithm

As mentioned above the controller 8 of the transmitter 2 is directly or indirectly provided with the voltage from each detection coil and extracts the amplitude and phase against each location over time. For this purpose, the controller 8 may include an excitation coil driver and a detector circuit.

As discussed earlier, a means to discriminate between foreign objects and friendly objects, e.g., power receivers, is required. One method that may be used to discriminate the kind of object present, is measurement of the coupling factor between the excitation coils and the object above the transmission pad which is influencing the excitation (OD) field. The Applicant found that objects comprising mostly metal tend to suppress the coupling (lower voltage amplitude output) with the OD field, whereas objects having a relatively significant amount of ferrite tend to enhance the coupling (higher voltage amplitude output), and that resonant structures, such as power receivers having resonant pick-up or secondary circuits, tend to induce a phase shift in the backscatter signal. Thus, it is possible to distinguish 'friendly' objects, such as the ferrite shielding of an inductive pickup coil, from 'foreign' objects, such as coins, if these characteristics in the OD field behaviour are suitably determined.

Figure 10A:
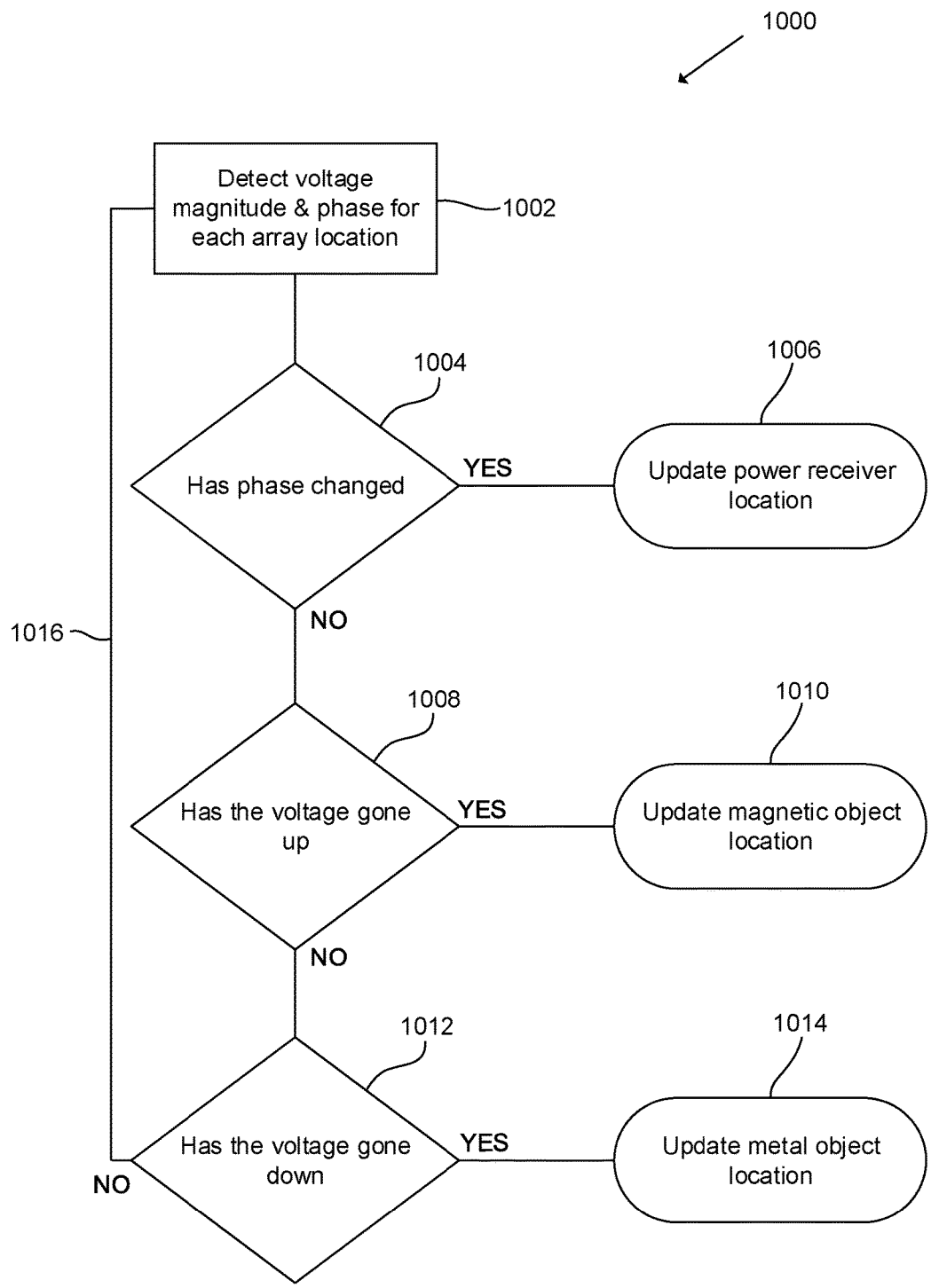
FIG. 10A is a flow diagram of the detection algorithm.

FIG. 10A shows an example algorithm 1000 for detecting objects. The controller 8 determines at step 1002 the voltage magnitude and phase at each location in the OD array. If at any location the phase has changed (step 1004), this location is updated at step 1006 to indicate that a power receiver is present. If the phase has not changed but the magnitude has increased (step 1008), this location is updated at step 1010 to indicate that a magnetic material is present. If the magnitude has not increased but has decreased (step 1012), this location is updated at step 1014 to indicate that a metal material is present. The determination continues (step 1016) for each location in the OD array and is then repeated either continuously, periodically or on the occurrence of a predefined event or events.

Figure 10B:
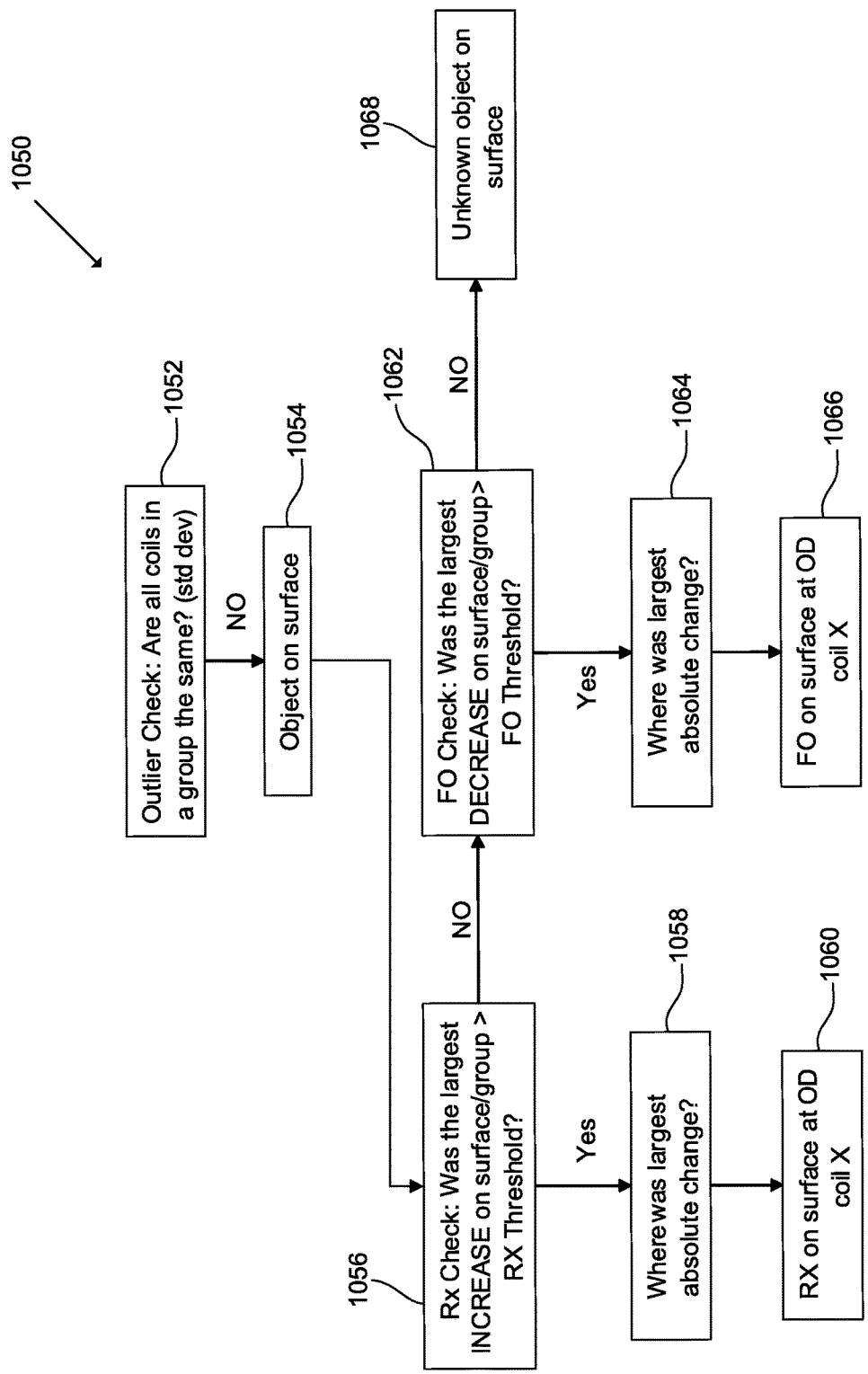
FIG. 10B is a flow diagram of another detection algorithm.

The algorithm 1000 of FIG. 10A illustrates an example where the detection of receivers and foreign objects is relatively simply provided by determining the relative magnitude and phase changes. Whilst these changes are present in many various scenarios, the amount of change may be difficult to distinguish from environmental and/or circuitry electronic noise. The changes may also be indistinguishable in scenarios where both a receiver and a foreign object are present. FIG. 10B shows another example algorithm 1050 for additionally facilitating detection of objects in such situations.

The algorithm 1050 recognises that there may be some variation in the measurements at ambient (i.e., no objects present) conditions across certain groups of the detection coils 702 and uses these groups to provide a measure of the standard deviation. The Applicant has found that these groups comprise neighbouring detection coils and are generally representative of the general topology of the coil array with the variations being due to manufacturing processes and tolerances. For example, the array may represent a polygon having more than four edges where sub-polygons having four or less edges defined therein provide the different detection coil groups, e.g., if the array is 'cross-shaped' (12-edged polygon), three four-edged polygons could be defined therein, such that three detection coil groups are defined in which the coils within each group have substantially consistent characteristics with the other coils in that group but may have different characteristics from the coils of the other groups. This grouping of coils allows differences in (magnitude and/or phase) measurements across the coils within those groups to be made with reasonable certainty in the accuracy of the measurements, thereby providing reliable detection of objects.

Accordingly in FIG. 10B, the controller 8 determines at step 1052 the standard deviation of the polar magnitude represented by the voltage magnitude and phase within each group of the OD array in a manner understood by those skilled in the art. If the standard deviation is within normal parameters, the controller 8 continues sampling the OD array either continuously, periodically or at defined events, as previously described. However, if within any group the standard deviation is more than a certain threshold amount (e.g., predetermined based on the known manufacturing tolerances) it is determined that one or more objects are in proximity of the charging surface (step 1054). Controller 8 then calculates a ratio of the current (i.e., t(n)) measurement of the polar magnitude and the (immediately) previous (i.e., t(n−1)) measurement of the polar magnitude as in Equation (1) for each detection coil within the group determined to have the object(s) therein or for all detection coils of the OD array. This ratio represents a change on the surface at a set location in Equation (1).

$$\text{Ratio}_{t(n)} = \text{Polar Magnitude}_{t(n)} / \text{Polar Magnitude}_{t(n-1)} \quad (1)$$

The controller 8 then runs a series of checks to detect the type of object(s) present based on the calculated ratios. At step 1056, a check for receiver(s) is performed by determining whether the largest ratio increase within the group (or surface) is greater than a receiver detection threshold, and if 'yes' the location of the largest ratio increase is determined (step 1058) and the location of the receiver at the determined detection coil is reported (step 1060) such that power transfer can be commenced using the IPT array. If the result of step 1056 is 'no' then at step 1062, a check for foreign object(s) is performed by determining whether the largest ratio decrease within the group (or surface) is greater than a foreign object detection threshold, and if 'yes' the location of the largest ratio decrease is determined (step 1064) and the location of the foreign object at the determined detection coil is reported (step 1066) such that power transfer using the IPT array is not enabled. If the result of step 1062 is 'no' then at step 1068, it is determined that an unknown object is present such that power transfer using the IPT array is not enabled. This 'unknown' object may represent a combination of a receiver and foreign object by the suitable selection of the receiver and foreign object thresholds. Such selection may be made through the measurement and modelling of various scenarios in a manner understood by those skilled in the art.

It is understood that the illustrated and described sequence of steps in FIGS. 10A and 10B are merely exemplary, and the sequences may be altered or replaced with parallel steps as appropriate.

Figure 11:
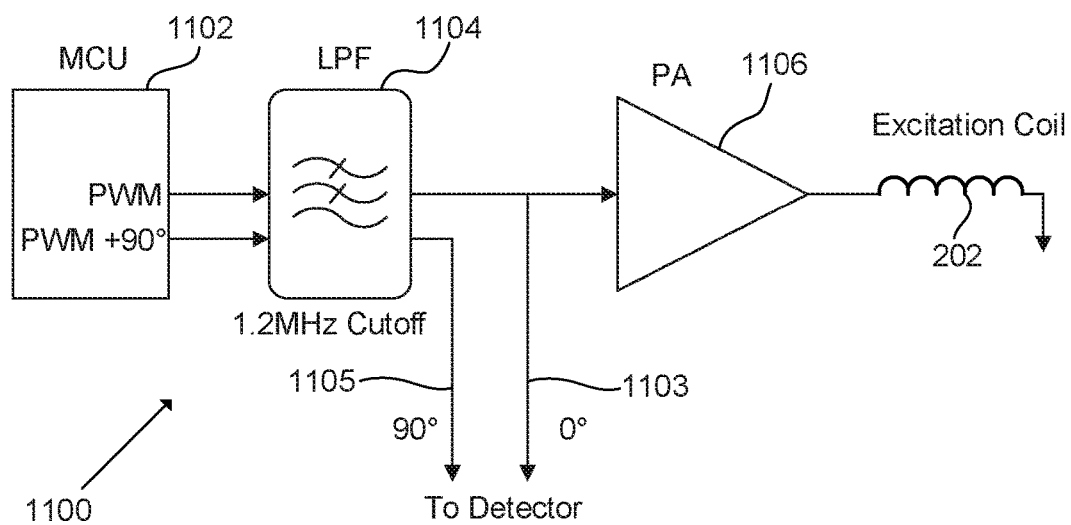
FIG. 11 is a schematic diagram of an excitation coil driver.

FIG. 11 shows an example of an excitation coil driver 1100. An MCU 1102 provides a PWM 1103 at the desired OD field frequency e.g.: 5 kHz/1 MHz (or range of frequencies of 1 kHz to 10 kHz/800 kHz to 1.2 MHz), as well as a 90° phase shifted signal 1105. Both signals are low pass filtered using a filter 1104 to create a sine wave from the PWM square wave by removing the harmonics and the filtered signals are provided to the detector (described later). A power amplifier 1106 scales the signal to the excitation coil 202 by a sufficient amount so that a good signal to noise ratio is provided, while not using excessive power.

Figure 12:
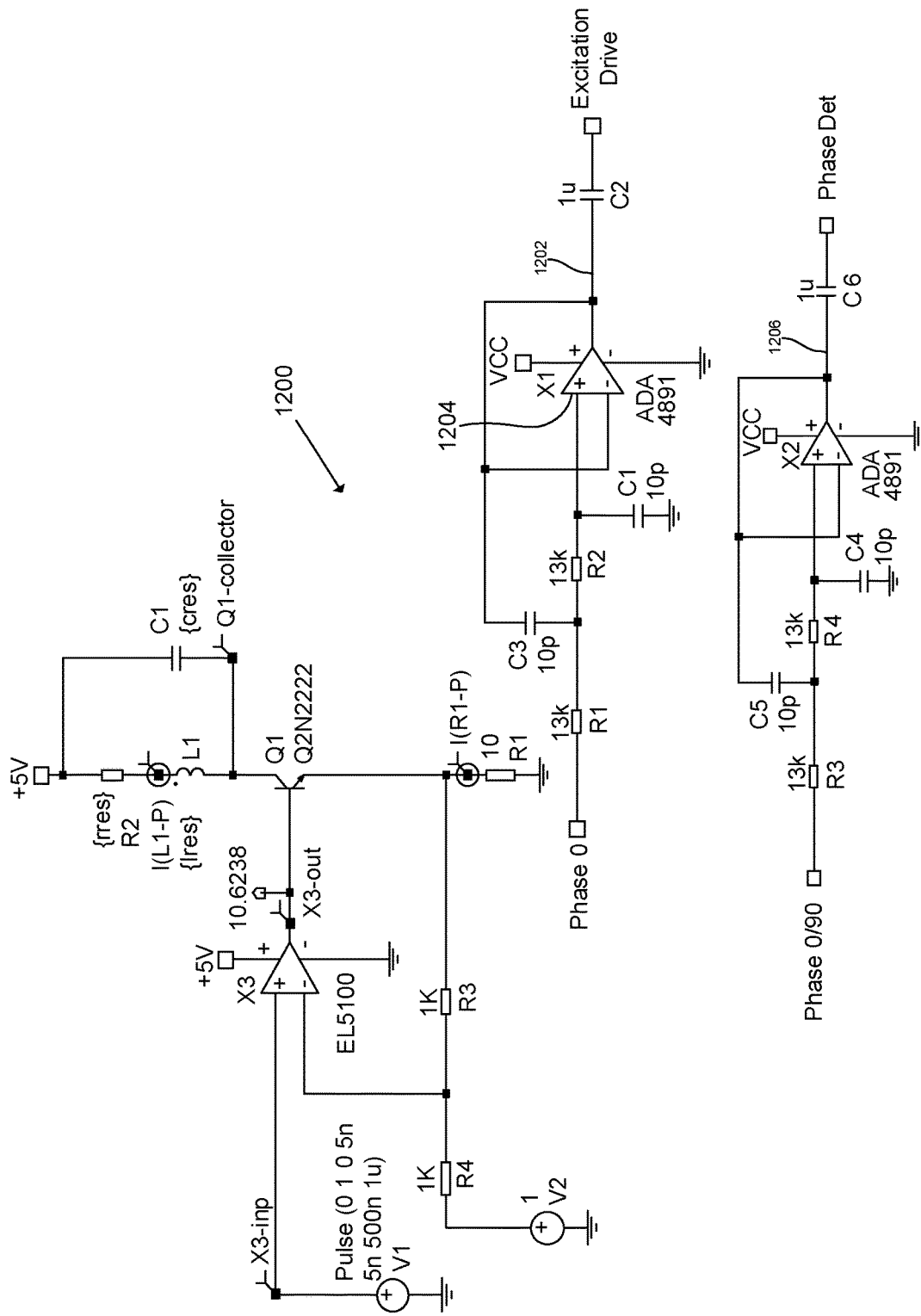
FIG. 12 is a circuit diagram of the excitation coil driver.

FIG. 12 shows another example circuit for the excitation coil driver circuit 1200. Two identical signal chains are used—one chain 1202 drives the excitation coil 202 using an operational amplifier (opamp) 1204 with a high drive capability. The other chain 1206 drives the controller (detector). The MCU 1102 can change the phase of the drive signal to the detector chain 1206, relative to the excitation chain 1202. In this way a 0° or 90° reference can be presented to the detector (described later).

Alternatively the actual excitation output is fed to a phase splitter (e.g.: R/C and C/R network) to generate two signals at 90° phase to each other, then an electronic switch is used to select one or the other.

Figure 13:
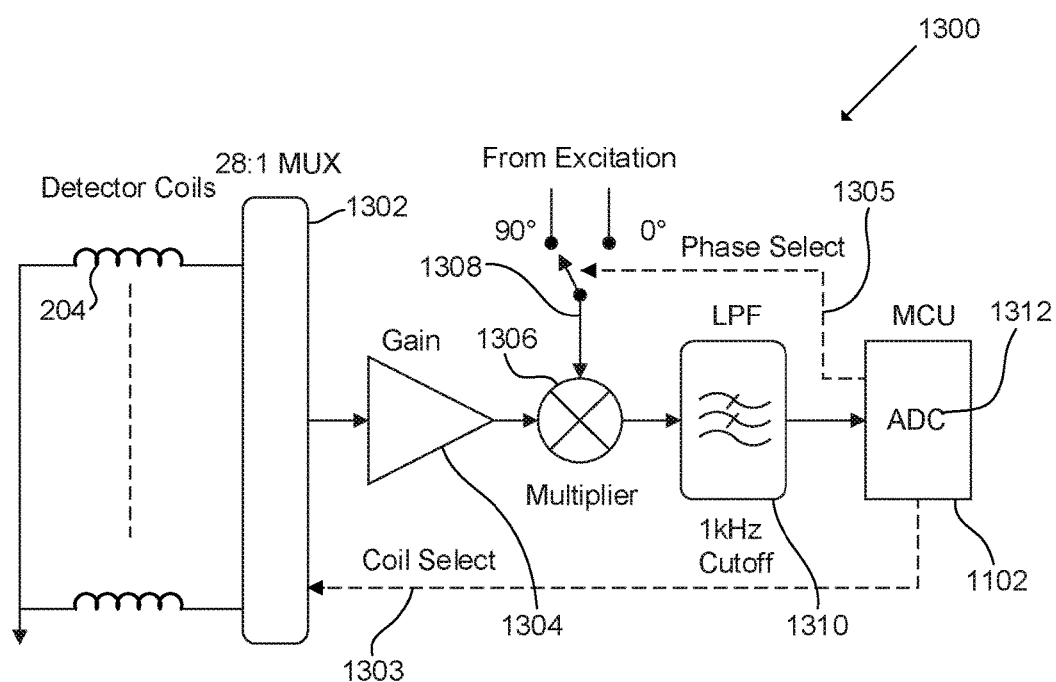
FIG. 13 is a schematic diagram of a detector.

FIG. 13 shows an example of a detector 1300 which has the detection coil array. Each detection coil 204 is connected to a multiplexer 1302. The multiplexer 1302 is either programmed with the signal 1303 to cycle through all of the detection coils continuously or periodically or may focus on certain detection coils where an object has been detected. The multiplexer output is amplified by amplifier 1304 and the excitation signal (voltage) described above is phase switched using switch 1305 by software in the MCU 1102 as described above. The amplified multiplexer output is mixed by a mixer 1306 (multiplied) with the two different phase switched excitation voltages 1308 from the excitation driver. Alternatively the mixing could be done by a DSP or microprocessor. The output of the mixer is low pass filtered by a filter 1310 and digitally sampled by an ADC 1312. The filter 1310 response determines the rate at which the detection coils can be switched, so the settling time should be selected according to application requirements on resolution of the OD field sampling.

This configuration of mixing and/or multiplexing has the advantage of tracking the frequency of the excitation without requiring variable filters. Further, the phase switching allows the MCU 1102 to extract amplitude and phase information from the digital signal. Because the voltage from the excitation coil(s) is the same frequency as the voltage from the detection coil(s), multiplying the two signals results in one composite signal comprised of one shifted up to double the frequency and one at DC. The low pass filter 1310 filters out the higher frequency signal. Then by phase shifting the excitation reference voltage by 90° and taking a second reading of the DC level, the phase can then be calculated at as the inverse tan of the division of the magnitudes of the two mixer DC outputs, for example using Equation (2):

$$\tan^{-1} \frac{[0\ deg]}{[90\ deg]} \qquad (2)$$

Figure 14:
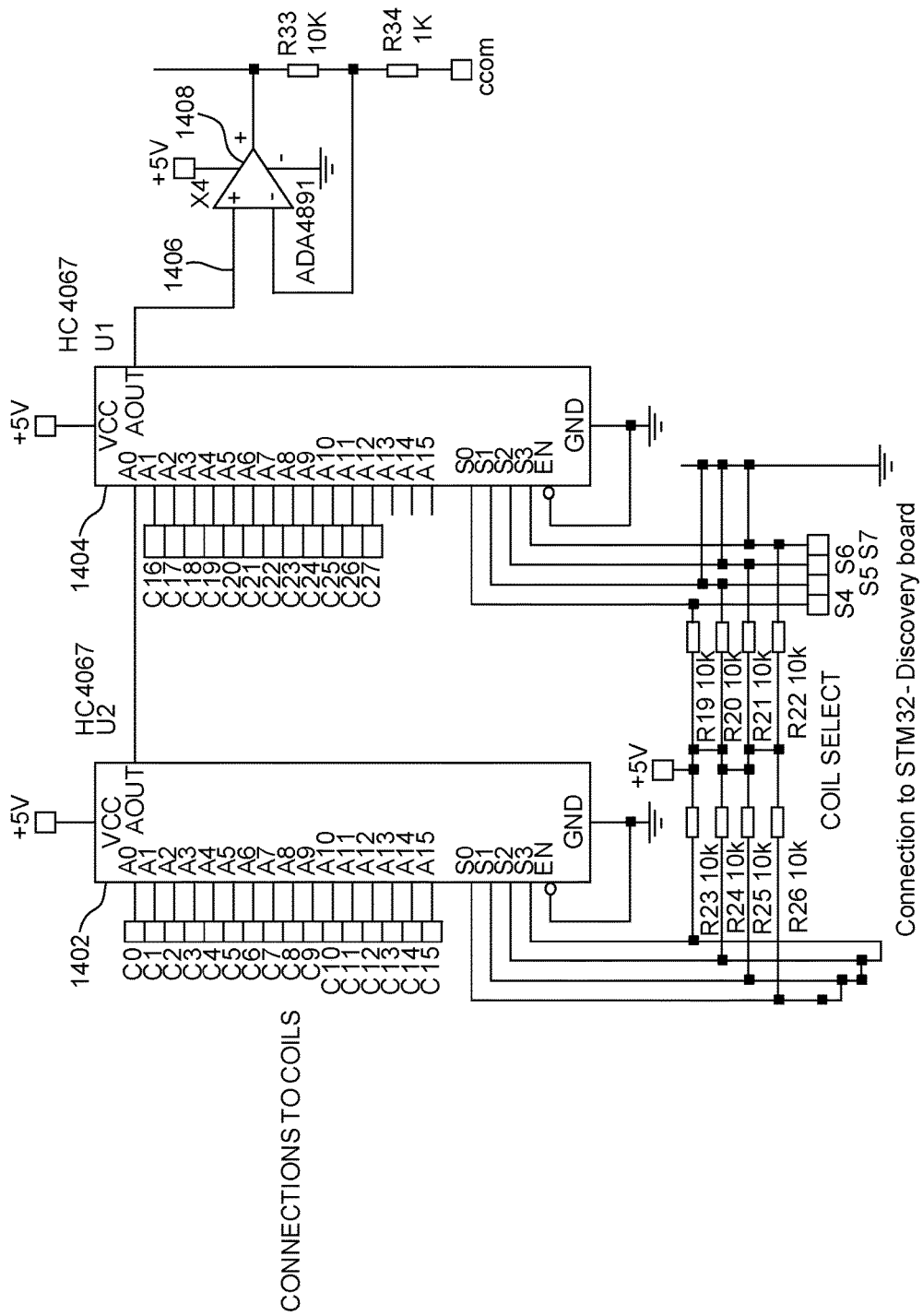
FIG. 14 is a circuit diagram of the multiplexer.
Figure 15:
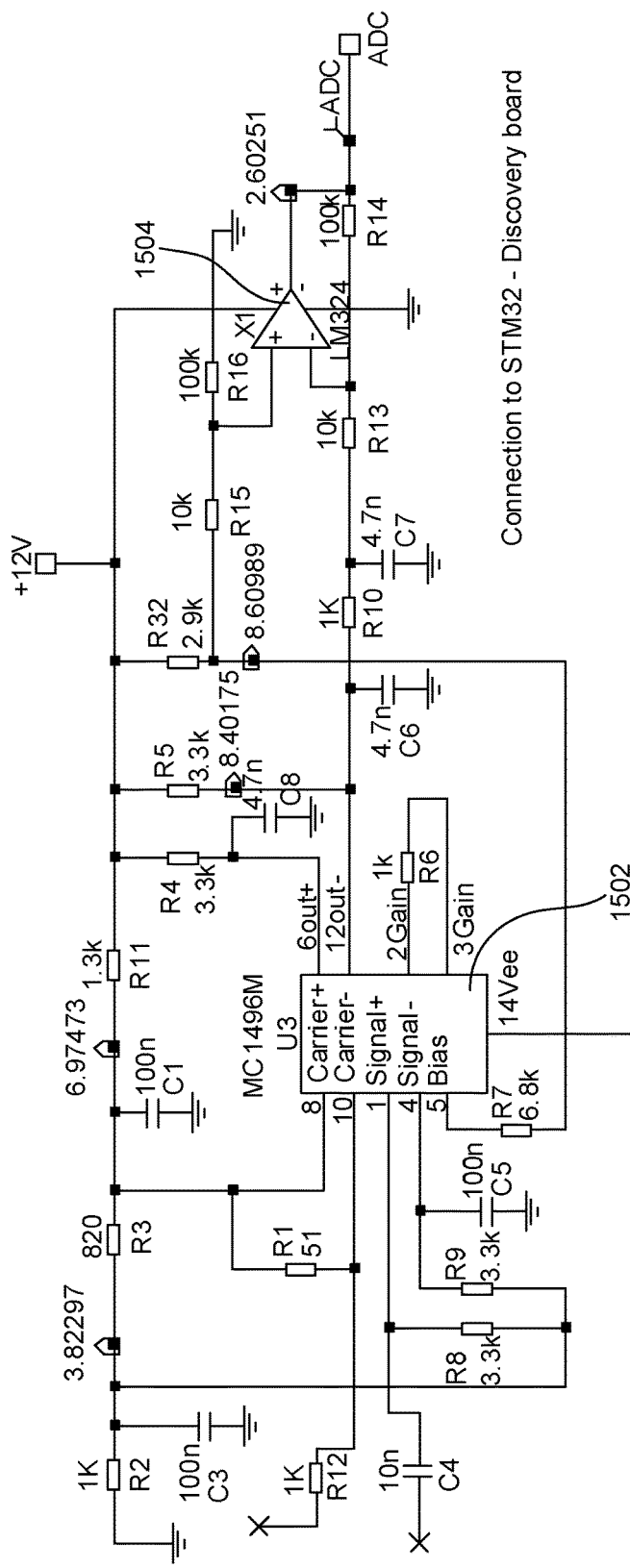
FIG. 15 is a circuit diagram of the mixer.

FIGS. 14 and 15 show an example circuit for the detector. The output of every detector coil 204 is connected to the inputs of one or more multiplexers 1402,1404 connected in series, with the eventual output 1406 amplified by an opamp 1408. The opamp 1408 output is passed to a Gilbert cell mixer 1502. This is followed by an amplifier 1504 providing both gain and DC offset to suit the input range of the ADC 1312.

The excitation/detection coils can be continuously driven so as to provide a continuous OD field, as the power consumption is low (about 10 mW). Alternatively, the OD field can be pulsed, which may lower the power consumption even more.

As absolute measurements are taken from the detection field, since it is decoupled from the IPT field, it is possible that if a foreign object is already present on the transmitter 'pad' at start-up this foreign object will not be detected but will merely be part of the ambient environment. A calibration token which is either physical (e.g., a metal disc) or digital (e.g., a calibration factor) of known properties may be used to calibrate the transmitter prior to use to avoid this, by locating it in set locations and adjusting the algorithm output until the location and object type are correctly determined.

Alternatively prior to use, relative phase and amplitude measurements between the primary, excitation and detection coils can be compared to relative expected values to determine anything unusual in the start-up environment. This can either generate an alert to manually check the environment or can be used to adjust the algorithm.

In a further alternative a calibration factor could also be determined by injecting a known signal into the system either through the existing coils or through an extra coil(s) at a certain spacing. This may avoid the need for manual calibration and/or a calibration object outside the system (e.g., a calibration token).

Figure 16:
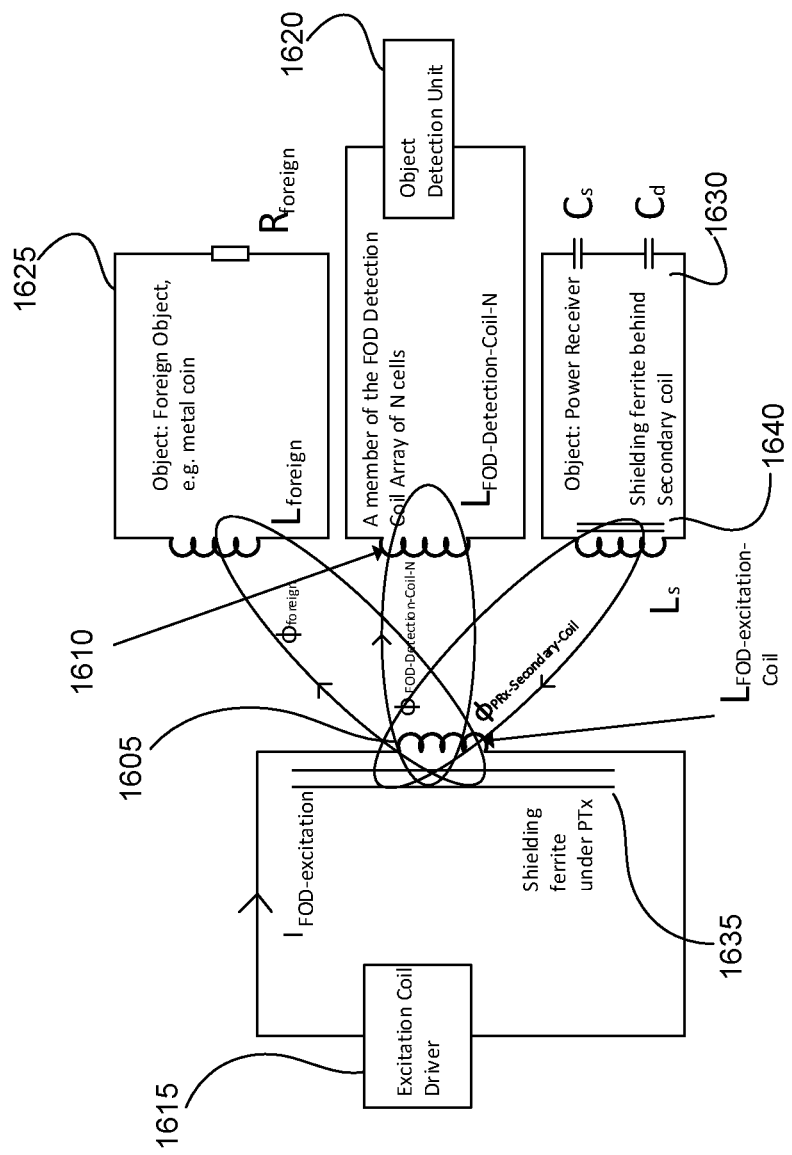
FIG. 16 is a schematic diagram of a further embodiment.

A further embodiment is described with respect to FIG. 16 and which includes some combinations of the forgoing features. Powering multiple receivers from a single transmitter array increases the dynamic range of the problem of detecting Foreign Object power dissipation in the presence of PRx (inductive power receiver) power transfer. This is because support for multiple PRx units increases the associated total PTx (inductive power transmitter) power transfer level substantially.

Spatial measurements (localised to a space approximating one PRx) provide a way to constrain the dynamic range of the problem, as additional Power Receivers are added to the Power Transmitter Product.

Evaluation of the complex impedances or a measurement of the coupling factor at each detector coil or cell in an array of detection coils, distributed spatially across the Interface Area (a transmitter surface for placing receivers), can provide useful indication of:
  Object Detection when (and where) an object placed on the Interface Surface;
  Whether the object is substantially metal in nature;
  Whether the object contains ferrite;
  Whether the object has a resonant circuit such as an L-C parallel resonant tank.

The embodiment described here may be used independently or in conjunction with other methods of Foreign Object Detection.

Referring to FIG. 16, the object detection system comprises the following system blocks:
  a) An FOD Excitation Coil (1605) consisting of a conductor or array of conductors (this may be separate and decoupled from the Primary Coil) placed to cover the Interface Area or Surface such that applied current(s) produce magnetic flux through the plane of the Interface Area. The conductor(s) may be placed in a 'double counter wound loop' configuration so that flux linkages (to counter-wound sections of the same conductor), from the Primary Coil, minimise the net induced voltage;
  b) An FOD Detection Coil Array (1610) consisting of an array of cells spatially distributed across the Interface Surface. Each cell contains a conductor(s) configured such that any magnetic flux generated by the FOD Excitation Coil that links with (i.e. passes through) an object placed near or on the Interface Surface, will also link with the conductor in at least one cell of the FOD Detection Coil Array;
  c) An Excitation Coil Driver (1615) circuit that applies a continuous or pulsed excitation current to the FOD Excitation Coil;
  d) An Object Detection Unit (1620) that measures and evaluates the complex impedances at each cell of the FOD Detection Coil Array. Typically this would be comprised of a measurement circuit that processes signals from each cell such that they can be evaluated by a numerical computation unit.

Also shown are a foreign object (1625) and a valid inductive power receiver (1630). The ferrite shielding for each of the excitation coil (at 1635) and the receiver (at 1630) are also shown, and advantageously employed to detect a valid receiver (1630).

The embodiment may evaluate each cell's output vector magnitude or polar magnitude as a measure of complex impedance is as follows:
  1. Apply excitation current $I_{FOD\text{-}excitation}$, by enabling the Excitation Coil Driver. The magnitude and frequency of $I_{FOD\text{-}excitation}$ (in conjunction with system implementation attributes) are arranged to produce sufficient levels of flux in $\phi_{foreign}$, $\phi_{FOD\text{-}Detection\text{-}Coil\text{-}N}$ (at each cell), $\phi_{PRx\text{-}secondary\text{-}Coil}$ such that the Object Detection System can evaluate complex impedance (by determining a measure of complex impedance) of the two different object groups (foreign object or valid receiver), with sufficient accuracy to distinguish between them. The frequency of $I_{FOD\text{-}excitation}$ is typically a point close to, but not exactly equal to, the resonant detection frequency $f_d$ formed by $L_s$, $C_s$, and $C_d$ in a PRx (1630);
  2. For each cell (1610) in the FOD Detection Coil Array, apply a termination impedance and measure the amplitude and phase of the voltage signal at each $L_{FOD\text{-}Detection\text{-}Coil\text{-}N}$-implemented by the object detection circuit (1620)—a measure of complex impedance.

3. Amplitude can be evaluated by measuring the components of the cell output signal that are in-phase, and in quadrature with a local reference (such as the Excitation Coil Driver output). The vector or polar magnitude can be evaluated as the root of the sum of the squares of the in-phase and quadrature components that were measured. Similarly the vector phase angle can be evaluated by computing the inverse or arc tangent of the ratio of the in-phase component divided by the quadrature component. However other methods of determining these measurements could alternatively be used.

Detection of the presence and type of an object using a measure of complex impedance at the detection coils can be performed as follows:

1. Record "empty board" tare values (E.g. at power-on of the transmitter) by evaluating each cell's output vector magnitude when there are no objects on the Interface Surface;
2. Periodically compute $\sigma_{FOD\text{-}Detection\text{-}Coils}^2$ as the statistical variance (ie standard deviation squared) of cell output vector magnitudes (ie measures of complex impendences) in the array (use net value after subtracting tare values for each cell);
3. If $\sigma_{FOD\text{-}Detection\text{-}Coils}^2$ is below a threshold $k_{array\_change}$, then remain idle and return to step 2. Threshold $k_{array\_change}$ may be established by prior experiment with the final system implementation;
4. Evaluate the ratio $N_{slope\_cell\_N}$ for each cell output vector magnitude divided by the previous measurement for that cell;
5. If $N_{slope\_cell\_N}$ is above a threshold $k_{slope\_PRXfound\_min}$, then a valid PRx has been found. Threshold $k_{slope\_PRXfound\_min}$ may be established by prior experiment with the final system implementation;
6. If $N_{slope\_cell\_N}$ is below a threshold $k_{slope\_PRXfound\_max}$, then a foreign object (or both a foreign object and a PRx together) has been found. Threshold $k_{slope\_PRXfound\_max}$ may be established by prior experiment with the final system implementation;
7. This survey can be repeated at alternate frequencies of $I_{FOD\text{-}excitation}$ for improved accuracy.

In alternative arrangements, the power coil of the transmitter may also be used as the excitation coil of the object detection system. Similarly the excitation coil may not be decoupled from a separate power coil of the transmitter. Whilst an array of detection coils has been employed, a single detection coil may alternatively be used. As a further alternative, the power coils may be employed as the detection coils. Furthermore different measures of complex impedance may be used. Also different types (in addition to receiver and foreign object) may be detected using the measures of complex impedance.

Whilst the embodiment has been described as detecting a receiver type of object in response to determining an increase in polar magnitude above a receiver detection threshold (i.e. $N_{slope\_cell\_N} > k_{slope\_PRXfound\_min}$), a more generic relationship to the polar magnitude could be used such as a change within a predetermined range. Similarly, whilst detection of a foreign object type of object has been described as being in response to a decrease in polar magnitude above a foreign object detection threshold (ie $N_{slope\_cell\_N} < k_{slope\_PRXfound\_max}$), a more generic relationship to the polar magnitude could be used such as a change within a second predetermined range.

The measure of complex impedance may be determined from in-phase and quadrature voltage components of the detection coil(s). This may be determined by a combination of analogue circuit components and digital processing—ie the polar magnitude.

The object detection algorithm may only be executed if a "significant" change in measurements is detected in order to improve accuracy in accounting for differences and/or changes in parameters of the coils in practice. This may be configured to occur when a calculated statistic variance of the change from a predetermined measure of complex impedance (eg the "empty board" values) in the detection coils (or a sub-group of these) is above a statistic variance detection threshold (ie $\sigma_{FOD\text{-}Detection\text{-}Coils}^2 > k_{array\_change}$).

Improved Detection of Foreign Objects

While a receiver object may exhibit the expected change in complex impedance within the frequency range expected of IPT receiver objects, there may be other resonant devices that may cause a change in complex impedance at a frequency close to their natural resonant frequency. An example is an RFID tag. In case where a receiver device is present together with an RFID tag, if the main IPT field is enabled, it will burn out the RFID tag. This may be undesirable. Objects such as those may be indistinguishable from either the no-object-condition or potential receiver-found-conditions.

A foreign object (such as an RFID tag) may affect a change in the coupling between excitation and detection coil that is also similar to that produced by a Qi receiver (or no object at all). One or more of the previously described methods of object detection may interpret this as a similar change to the apparent magnitude and/or phase of the detection signal compared to a receiver object, depending on the configuration (e.g. choice of excitation frequency) and level of sensitivity selected.

One or more of the previously described methods of object detection may perform a Digital Ping to further establish if and what type of object has been. However, it is a concern that such execution of a Digital Ping, (e.g. MiFare proximity transport access card) may cause irreversible damage to certain foreign objects including electronic systems e.g. bus or train proximity ticket cards or NFC credit cards. Additionally, in situations where such a sensitive foreign object (containing an electronic system e.g. RFID) is simultaneously placed with a wirelessly chargeable mobile phone, the object detection system may not successfully detect this foreign object due to the presence of the approved wirelessly chargeable mobile phone. Given that such cards are often provided in proximity to (or co-located with e.g. in a protective sleeve or wallet) a wirelessly chargeable mobile phone, this may be sub optimal.

The inventor has determined it may be useful to prevent the system from attempting power transfer even momentarily (e.g. RFID tags that may otherwise be detected as a potential receiver, or not-an-object whilst there is also a valid power receiver nearby), by detecting frequency dependent (e.g. resonant) properties of objects within the charging zone.

For example RFID tags are known to resonate at a specific frequency of operation, and would exhibit a significant change in coupling of the excitation to detector coil if the system conducts a scan at this specific frequency.

In order to detect other resonant devices, one technique is to determine the response at expected frequencies for various non approved devices. In this context non approved device means anything other than IPT receiver devices that are approved for use with the transmitter. Approved devices may include Qi ver 1.1 or above compliant IPT receivers. Non approved devices may include other resonant or non resonant devices. For example RFID tags are known to resonate at for example:

120-150 kHz (LF)
13.56 MHz (HF) ISM band
433 MHz (UHF)
865-868 MHz (Europe)
860-960 MHz
902-928 MHz (North America) UHF ISM band
2.4 GHz (microwave) ISM band
5725-5875 MHz (microwave) ISM band
24.125, 61.25, 122.5, 245 GHz ISM bands If an impedance above or below a threshold is determined at or adjacent to any of these RFID frequencies, the system would determine the existence of a non-approved resonant device and disable IPT. Other non approved devices may be included depending on the application. For example in FIG. 17 the system would check for impedance above or below a threshold 1702 at around 13.56 MHz. Where the non approved device frequency is close to an approved IPT device resonant frequency, it may require a very narrowly tuned excitation and detection system.

Alternatively the system could frequency hop or scan a range of frequencies looking for any anomalous response, other than at expected frequencies for approved receiver devices. For example approved IPT devices might be expected to resonate within the following frequencies (which may be selected according to the requirements of the application):

70-150 kHz eg: 100 kHz or 120 kHz
900 kHz-1.1 MHz eg: 1 MHz (in accordance with the QI 1.1 specification for example)

If an impedance below or above a threshold is determined at any frequency apart from those frequencies, the system would determine the existence of a non-approved resonant device and disable IPT. For example in FIG. 17 the system would check for impedance below or above a threshold 1704 1706 at frequencies other than 120 kHz and 1 MHz.

This may be implemented by measuring the (spectral) frequency-impedance response of the OD system 200, and checking that this spectral response falls within known desirable ranges whereby a problematic foreign object (e.g. RFID tag) must not be present. An example is that there would be a large acceptable area for (relatively) broad peaks in the range 70-150 kHz to allow receivers to be present, but if a narrow spike was found at 120-140 kHz then it may be deemed that a LF RFID tag is present. The width of the resonant response may be used to determine if the object is approved or not. This is equivalent to the "Q" or bandwidth of the response.

These anticipated or predetermined reflected impedance responses from RFID tags and other non-authorised devices can be considered predetermined reflected impendence signatures associated with non-authorised devices. These signatures can be associated with specific frequencies and transmitted power levels and stored by the object detection system in order to detect the presence of a non-authorised device. The object detection system may additionally or alternatively stored predetermined reflected impedance signatures associated with authorised devices so that a non-authorised device can be detected when a reflected impendence signature is determined which is not associated with an authorised device. Various reflected impedance signature examples are described in more detail below.

Figure 17:
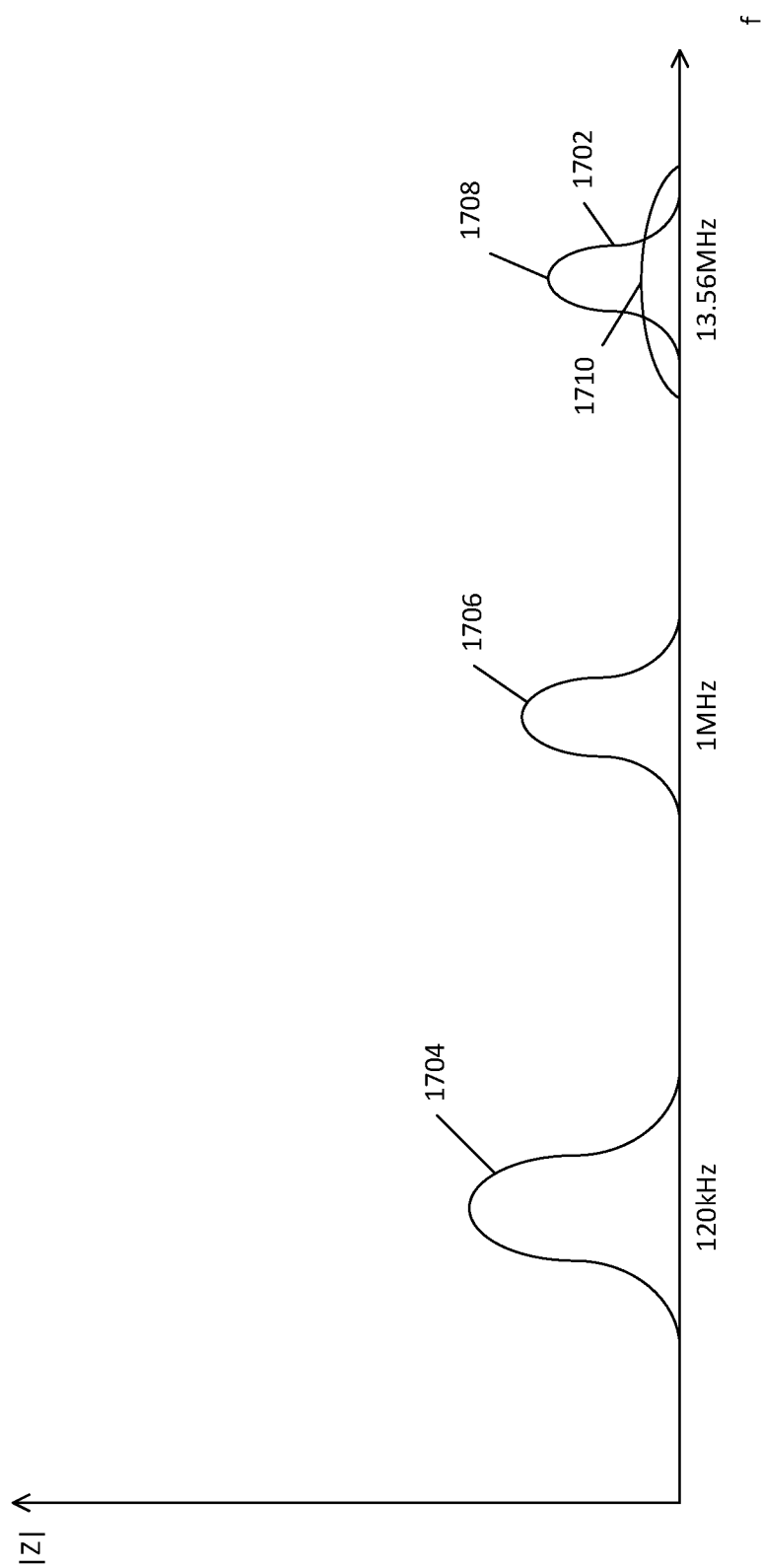
FIG. 17 is a graph of the impedance of various resonant devices.

In a further alternative the system may detect the two step change in impedance associated with an RFID chip once it starts up. This can help to distinguish a non approved device having a resonant frequency close to that of an approved IPT device. As shown in FIG. 17 an RFID chip would initially present a high Q resonance 1708 at around 13.56 MHz, when initially scanned at a first power level. At different field strength levels or durations of excitation, the RFID chip may start up/not start up, drawing significantly different amounts of power (i.e. impedance presented) in these cases. The RFID tag will then switch on and present a lower Q resonance 1710. This characteristic two step impedance change or "compression effect" could be detected and disable IPT. This change might also be explained as a reduction in proportionality of observed output responses changing with (increasing) input stimulus. This could be implemented with series impedances in the input stimulus to form a potential divider network, whose gain varies with this change in impedance as the filter capacitance charges up. This gain can then be employed to produce a proportional amplitude voltage signal that can be compared with thresholds to evaluate whether such a non-authorised device is present.

For a given power level and a predetermined RFID tag, it is possible to anticipate the duration of time before the chip starts up. In other words a "signature" comprised of a first impedance then after a predetermined time a second impedance at the resonant frequency of the RFID tag can be used to more confidently detect the RFID tag. This method can also be useful two distinguish between an RFID tag and an authorised receiver (such as a QI receiver) having resonant frequencies similar to each other.

The use of the two-step impedance change method can be used together with the method of determining impedance changes at expected resonant frequencies. Alternatively the two-step impedance change method can be used without recourse to resonant frequencies of RFID tags or authorised receivers, as discussed in an embodiment below.

In a further alternative the system may detect the two step change in impedance associated with the biasing of rectifier diodes or other semiconductor devices once the characteristic semiconductor junction threshold voltage (e.g. 0.7 V per silicon diode) is exceeded by the application of an excitation field, which may or may not be at the resonant frequency of the foreign object such as an RFID chip.

For example the system may look at non-linear or stepwise changes in magnitude or time response at predetermined frequencies, e.g. to distinguish between a 900 MHz RFID tag and the 1 MHz±10% dual resonant circuit of a Qi receiver. The RFID tag may exhibit a response that changes markedly depending on the level of excitation—it may be a narrow response (high Q) at low excitation levels, then exhibit a stepwise change in response when the excitation level is increased to stimulate the RFID active circuit to start drawing more power (broad bandwidth, low Q due to parallel resonant tank with low equivalent impedance in shunt with it).

Additionally an RFID active circuit may appear to be a light load (high impedance) initially (t=0 ms), but become a high load (low impedance) upon having had sufficient time (e.g. t=10 ms) to charge up its internal storage capacitances, build up resonance in the resonant receiver circuit, or to bias semiconductor junctions in a connected circuit (e.g. RFID chip).

The change in impedance may be detected by measuring an impedance magnitude at a RFID frequency to an impedance magnitude at a frequency closely spaced from the RFID frequency. For an RFID tag this should initially have a significant difference when it is a higher Q resonance 1708. If it is measured subsequently that the difference 1710 reduces between the impedance magnitude at the RFID frequency and the impedance magnitude at the closely spaced frequency, this can be used to confirm the presence of an NFC PICC card/tag object.

Figure 18A:
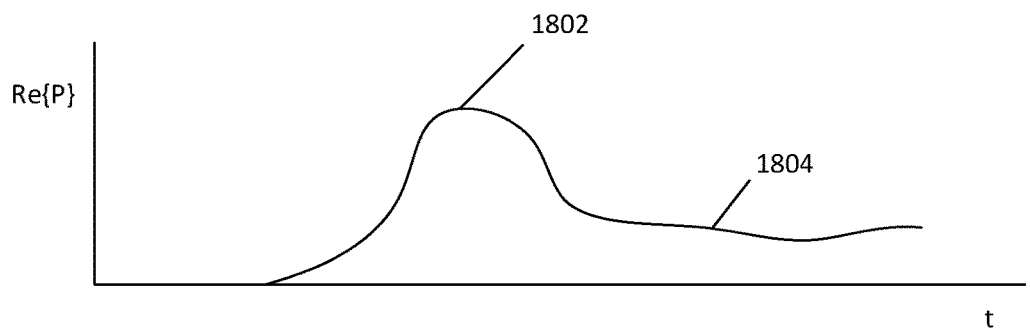
FIGS. 18A&B are graphs of the real power of various resonant devices.
Figure 18B:
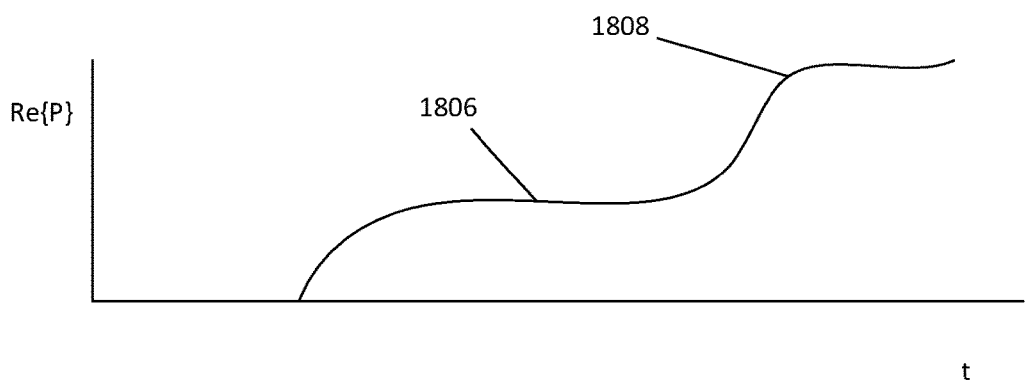

The signature associated with RFID tags may also be detected using a real power signature. For example as shown in FIG. 18A the power initially 1802 may be relatively high while the capacitor is charging. Once charged the power diminished significantly 1804 as the running power for the state machine is minimal. On the other hand in FIG. 18B a Qi receiver has an initial level of power 1806 which only increases 1808 after the handshake. The microprocessor in a Qi receiver uses a lot more power that the state machine in a RFID tag.

Figure 19B:
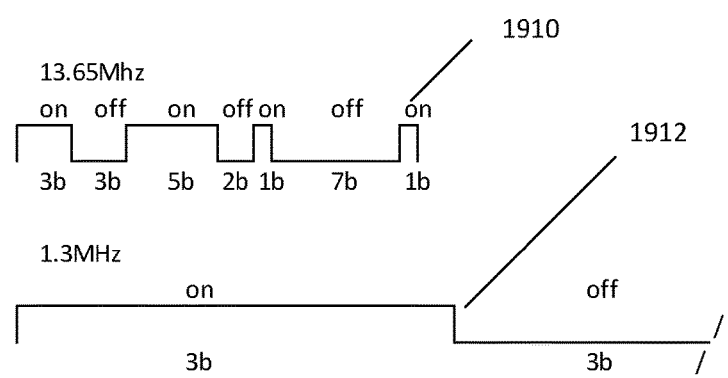
FIG. 19b is a graph of the polling commands at different carrier frequencies.
Figure 19A:
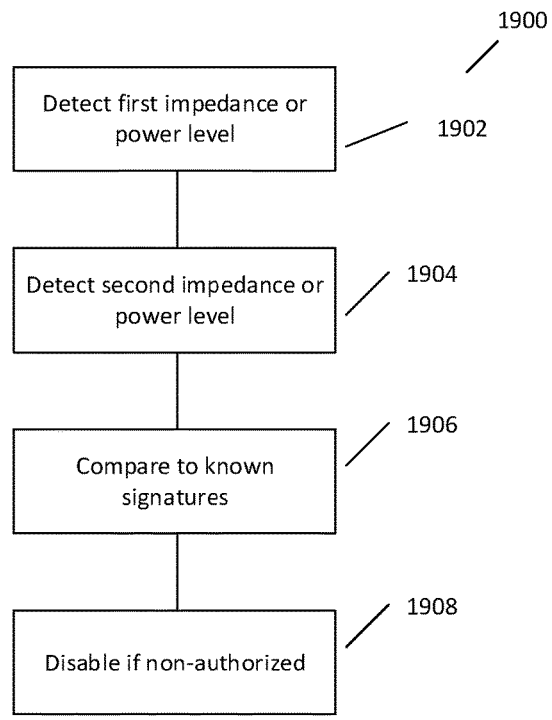
FIG. 19a is a flow diagram of a signature method of detecting non authorized resonant devices such as RFID/NFC tags.

FIG. 19(a) shows a flow diagram relating to the RFID signature method 1900. The transmitter detects 1902 a first impedance or power level related to an object in the IPT field. The transmitter detects 1904 a second impedance or power level related to an object in the IPT field. The transmitter then matches 1906 the first and second measurements to a library of known signatures for non-authorized objects (eg: RFID/NFC devices) and/or authorized IPT receivers. If a non-authorized object is detected IPT is disabled 1908.

The reflected impedance signature may be associated with communications activity from the non-authorised device. For example some RFID tags use backscatter communication, some generate a transmission (active tags, typically the LF 120 kHz or 433, 848 MHz ones). The OD system 200 could "read" the backscatter communications being generated by the RFID chip when it becomes active. It need not employ an RFID chip to trigger this response, it could send a suitable signal that will wake up a RFID tag, and monitor for the known sub carrier modulation that constitutes a valid handshake reply by an RFID tag. The initial signal could be at a much lower frequency that the standard carrier frequency for a RFID reader (eg: 13.56 MHz as defined in ISO/IEC 14443-2), such as the 1 MHz digital ping frequency of Qi. The OD system 200 may conduct a polling process where it transmits a command sequence that the RFID object is designed to wait for (e.g. sequential sending of "REQA", "WUPA" "REQB", "WUPB" as specified by ISO/IEC 14443-3) but not necessarily at the frequency specified by the RFID scheme (e.g. NFC), so that the aforementioned modulation clock or subcarrier is generated by the RFID chip. The OD system 200 may be configured to detect a predetermined communications sequence from the RFID tag, for example the first or a truncated part of the normal handshaking messages that would occur between an RFID tag and an RFID reader. It is not necessary to implement any of the full message decoding capability of an RFID reader, just detection of the sub carrier modulation response. For example the OD system 200 may look for a detectable sub carrier amplitude modulation (e.g. $f_c/128$ $f_c/64$ $f_c/32$ $f_c/16$ where fc is 13.56 MHz independent of what frequency the polling request is sent at using Type A (On-Off Keying OOK, Miller coded), Type B (10% ASK Manchester coded), Type F (10% ASK Manchester coded per JIS X 6319-4) or Type V (BPSK NRZ-L), specified by ISO/IEC 14443-2 for Types A, B, JIS X 6319-4 for Type F, ISO/IEC 15693 for Type V) specified in various RFID systems.

If the polling commands sent by the transmitter are sent at a lower frequency, then the commands may require certain adaptions for a standard NFC or RFID tag to recognise them. The polling commands cycle through respective commands for each type of receiver. When the receiver detects a command relating to its type it responds.

Certain types of RFID tags detect the polling command modulation pattern without use of a local (i.e. on-board the card/tag PICC object) precision time-base (i.e. time reference such as a quartz crystal or silicon MEMS oscillator) by disciplining or synchronising a less precise local oscillator (e.g. R-C oscillator on-chip in the card/tag) to the incoming carrier frequency. Such a disciplined local oscillator can then be used to detect the two modulation states by measuring the duration of time where the carrier is present or found to be in its highest amplitude as a first state (e.g. unmodulated level of 0% ASK), in comparison to the duration of time where the carrier is not present or found to be in its lowest amplitude as a second state (e.g. modulated level of −10% ASK or −100% ASK i.e. Off) in order to detect a valid polling command. Therefore if the carrier frequency being used is lower than the standard value, it may be necessary to increase the period of each modulated bit in the polling command, so that the number of cycles or duration of each bit using a lower than standard carrier frequency matches an identical number of cycles of the carrier as defined at the standard carrier frequency. This is used because cycle counting (or equivalently extracting a clock signal from the carrier to use as a time reference) is a simple mechanism not requiring an auxiliary or independent precision time reference on the PICC card/tag in order to detect expected signals and respond to them. By extracting a clock signal from the carrier however, the PICC card/tag does rely entirely on the implementation of the carrier having set its frequency to the standard value of 13.56 MHz and will not be aware of any deviation from that. Therefore the above approach will still work to stimulate the RFID object to respond with an acknowledgement (ATQ-A/ATQ-B, ATQ-C etc).

For example if the polling command includes a series of bits as shown in table 1:

| | | | No. Bits | | | | |
|---|---|---|---|---|---|---|---|
| | 3 | 3 | 5 | 2 | 1 | 7 | 1 |
| State | on | off | on | off | on | off | on |

Then the modulation period to get the same number of cycles/bits will be 10 times that for 13 MHz as shown in table 2:

| | State | | | | | | |
|---|---|---|---|---|---|---|---|
| Period | on 30 T | off 30 T | on 50 T | off 20 T | on 10 T | off 70 T | on 10 T |
| 13 MHz | 21 us | 21 us | 35 us | 14 us | 7 us | 49 us | 7 us |
| 1.3 MHz | 210 us | 210 us | 350 us | 140 us | 70 us | 490 us | 70 us |

FIG. 19(b) shows the polling command 1910 @13.56 MHz compared to the polling command 1912 @1.3 MHz. This ensures that the same number of cycles are present to trigger the RFID object response.

Figure 20:
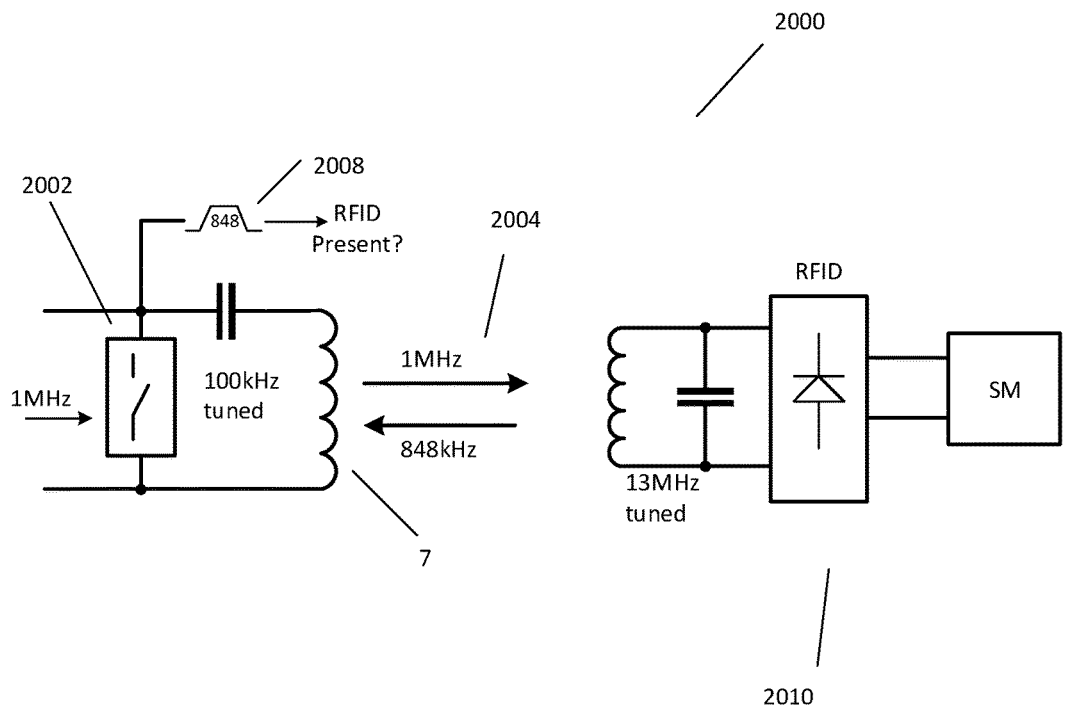
FIG. 20 is a circuit diagram of a transmitter with a polling request at 1 MHz.

The RFID polling request to stimulate a response from a PICC (NFC card/tag) can be generated by the IPT transmitting coil as 7 as described earlier. The advantage to this is that a separate RFID/NFC reader antenna and circuit is not required. Typically most IPT transmitters will include an ASK backscatter communication module to communicate with the receiver. This typically includes a current transformer and a bandpass filter at 2 kHz (which is the frequency the receiver modulates the IPT field at) or an equivalent voltage mode detection may be used. In this case the transmitter 2 includes a communication module 2000 as shown in FIG. 20. A modulator 2002 introduces the polling commands 2004 into the coil 7 voltage. The polling commands are received by any NFC or RFID tags in range, and once energised the tag amplitude modulates the IPT signal at a subcarrier frequency. This is detected with the current transformer (or via a voltage measurement), which has one or more bandpass filters. A filter 2008 is centred about the expected PICC (card/tag) sub-carrier frequency that is used to modulate its acknowledgement response onto (i.e. 212, 424 or 848 kHz) for the response from the RFID/NFC tag 2010 (or a range of bandpass filters about expected RFID/NFC response frequencies). If the valid response is received IPT is disabled. The bandpass filters might have a suitable bandwidth to encompass the typical RFID/NFC responses, for example 106-318, 424-480, 847-848 kHz.

If the carrier frequency is lower than 13.56 Mhz, the acknowledgement (ATQ-A/ATQ-B, ATQ-C etc) modulation may also be proportionately lower in frequency. If so, then bandpass filters might have a suitable bandwidth for the expected lower frequency RFID/NFC response. For example if 8 carrier cycles are implied by the sub-carrier modulation specification of 848 kHz for a 13.56 MHz carrier, then equivalently by using a 1.356 MHz carrier, the stimulated card/tag PICC response will be a sub-carrier of 84.8 kHz. A modulation detection filter should accordingly be centred or include this expected range of frequency (84.8 kHz in the example).

To reduce the bandwidth required of a logic portion of such a demodulator implementation, a simple magnitude detector including a parallel (high impedance at notch frequency) or series (low impedance at notch frequency) resonant tank together with a rectifier and capacitor filter to convert the signal to d.c. could be employed to allow a low cost microcontroller to use a comparatively low bandwidth ADC to detect the magnitude and thus presence of a sub-carrier.

Once a subcarrier has been detected, a power transmitter would return to an idle or sleep state. Subsequent detection of objects or change in position of the objects, would result in a new search for presence of an NFC object by repeating the above search for a subcarrier.

Figure 21:
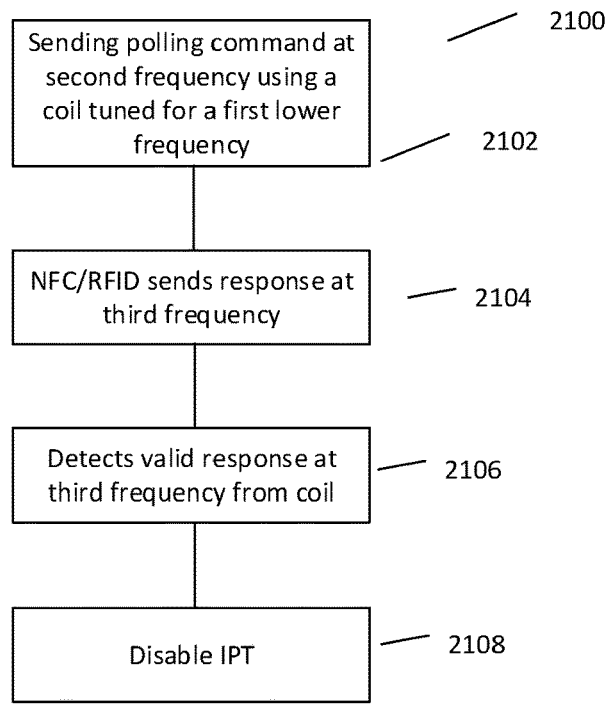
FIG. 21 is a flow diagram of a method of sending polling commands to detect non authorized resonant devices such as RFID/NFC tags.

FIG. 21 shows a flow diagram relating to the RFID sub carrier modulation technique 2100. The transmitter sends 2102 polling commands using the IPT coil or the OD coil (as opposed to a separate RFID/NFC reader module). The coil is tuned to a first frequency and modulated at a second higher frequency in order to emulate a predetermined NFC/RFID object polling command. Any RFID/NFC tags in range receive 2104 the command and send a response. The transmitter detects 2106 for any valid RFID/NFC response at a third frequency corresponding to the predetermined response of an NFC/RFID object. If a valid response is received at the third frequency this Indicate the presence of an NFC/RFID object and IPT is disabled 2108.

Figure 22:
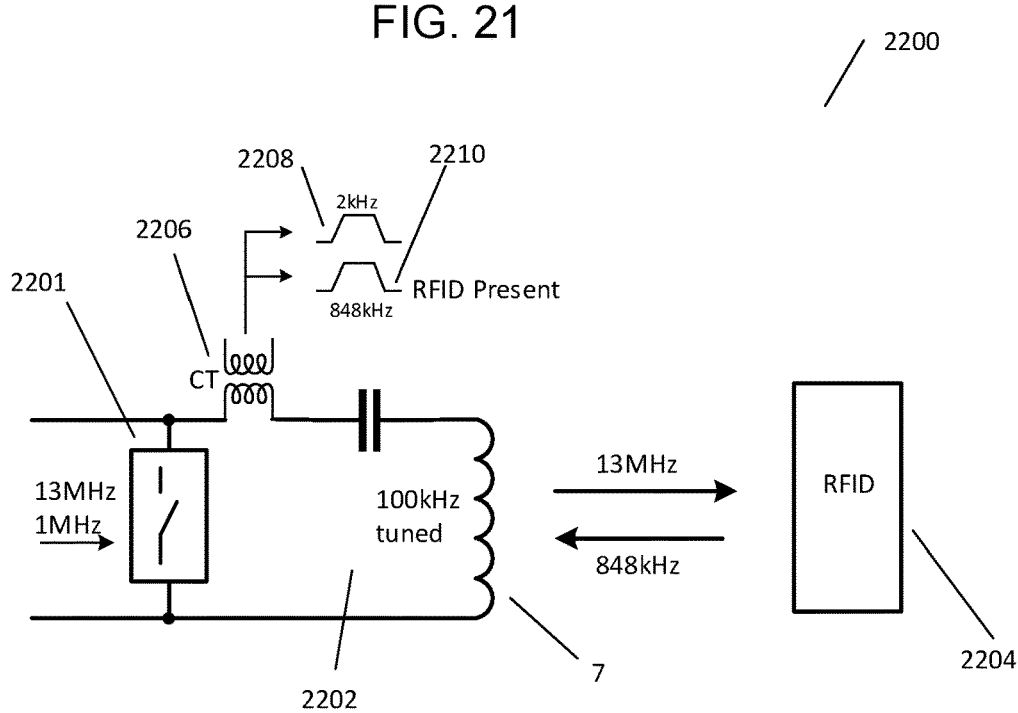
FIG. 22 is a circuit diagram of a transmitter with a with a polling request at 13.56 MHz.

Alternatively the polling commands 2200 may be sent at the expected $F_c$ frequency eg: 13.56 MHz by the inverter 2201 as shown in FIG. 22. In this case the IPT coil 7 or the OD coil 202 will be tuned 2202 at a significantly lower frequency. The RFID/NFC tag 2202 replies at 848 kHz which is detected with the current transformer 2206, which has one or more bandpass filters. A first filter 2210 is centred about 848 kHz for the response from the RFID/NFC tag 2204.

In some cases the transmitter transmission circuit will not be tuned to 100 kHz by a tuning capacitor, but will be adapted or optimised to this frequency by the selection of coil inductance and inverter drive voltage. For example a power transfer circuit may have a 10 micro-Henry inductance using say 10 windings for the coil. At 100 kHz this results in a reactance of approximately 6 ohm, whereas driving 13 MHz through this coil would result in reactance of approximately 800 ohms requiring a much higher voltage to drive a current of a similar magnitude. Accordingly an NFC reader coil will have a much lower inductance with less turns, larger size, in order to enable the inverter to drive at the higher frequency with reasonable operating parameters (eg 5V). Driving an IPT circuit, optimised for say 110 kHz, at a much higher frequency in order to stimulate a response from any proximate non-authorised devices, may require that the inverter is driven at a higher voltage, eg: 20V in order to have enough current for an RFID card to detect the resulting field.

In the event an authorised receiver is detected, inverter 2201 send the normal IPT signal to coil 7. The inverter 2201 will also modulate the IPT voltage at 1 Mhz to communicate with the receiver 3. A second filter 2208 is centred about 2 kHz for the standard ASK backscatter communication response from the IPT receiver 3.

The power transmitting coil may be approximate 12 uH inductance and tuned for approximately 100 kHz. Most RFID implementations use 1-4 uH or less in order to be tuned at 13.56 MHz. Thus the polling request is sent from a multi purpose coil. That is to say a coil that has a first purpose of either IPT power transfer eg: coil or object detection eg: coil 202. The second purpose is sending polling request to any non authorized objects such as nearby NFC/RFID tags. By way of contrast incorporating a separate NFC/RFID tag reader module would include a reader coil that only had a single purpose.

Alternatively other communications protocols for other non authorised objects may be included and/or signatures for further types on non authorised objects.

For example the NFC-F (Sony Felica cards, used for rail transport in Japan) protocol does not appear to generate a subcarrier, but it does modulate the PCD's carrier directly at a net symbol rate of 212 kbit/sec. The corresponding detector for this type of card would be approx. 212 kHz—however the message content would spread the frequency content (i.e. sidebands) significantly around this 212 kHz 'median' symbol rate. Literature suggests that the power spectral density (psd) of Manchester coding is from 0-150% of the bit rate, so perhaps specify a detection bandwidth of up to 212×1.5=318 kHz. The majority of the signal power will lie between 50% and 100% of the bit rate, so perhaps 212×0.5=106 kHz up to 212 kHz.

The OD system 200 may implement detection of reflected impedance signatures associated with non-authorised devices and/or authorised devices using lower power levels than those normally employed to interact with authorised devices so as to avoid destruction of any RFID tags which may be present. Detection of such devices by the OD system will then disable power transfer by the inductive power transmitter. An initial foreign object detection phase implemented using the above embodiments can be carried out prior to and at a lower power level than the digital ping phase used to detect authorised devices. For example the polling commands may be sent at 50% or 20% of the power of the digital ping.

To prevent a "false positive" result in the case that a product containing an authorized Qi receiver also contains an NFC function in card/tag (PICC) emulation mode, the reciever can first disable its NFC PICC emulation function when it detects a Qi Ping e.g. 1 MHz signal or other impulse stimulus (e.g. 175 kHz burst) known or declared to be used by a transmitter for detection of a potential receiver to charge. Whenever a reciever also has an NFC emulation function, it should temporarily (e.g. 5 sec) disable that function when an impulse is detected in the rectified voltage (Vr) of the power transfer circuit, in order that it not produce a false positive when such a transmitter executes a search for RFID objects.

To more reliably eliminate such a false positive during an RFID ping or detection search, a Qi transmitter should emit an agreed upon signal that announces to an authorized Qi receiver that it is about to be probed by a Qi transmitter—such as a tone burst at 1 MHz, 175 kHz, or 110 kHz.

This method of detection of other resonant devices may be combined with any of the previously mentioned approaches for object detection.

Figure 23:
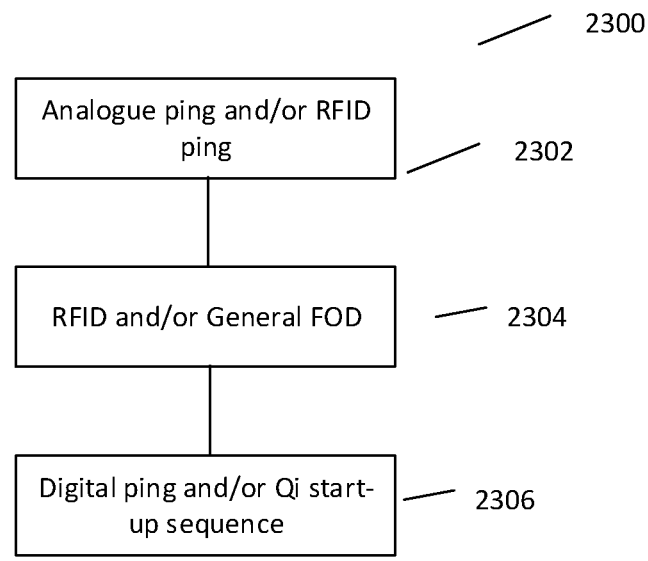
FIG. 23 is a flow diagram of a method of sending signals from a transmitter to disable NFC emulation in a valid receiver.

The method employed by the transmitter is shown in FIG. 23. The transmitter uses an Analog Ping 2302 to monitor for newly placed objects such as valid receivers, foreign objects including RFID. Various methods are employed for Analog Ping and this is not defined by the Qi specification. For example this may be implemented by a short impulse to the IPT transmitter coil and look for any reflected impedance. Alternatively separate object detection coils may be used.

The analogue ping 2302 may be supplemented with a RFID Ping which is a predetermined signal which can be used to signal the receiver to behave differently. This may be more robust than relying on the receiver to detect the Analog Ping. The RFID Ping could be a separate step to the Analog Ping, or the RFID Ping would replace the Analog Ping and be used for detecting any object as well as signalling to the receiver.

The RFID Ping could be implemented by a short low power tone burst in the standard power transfer frequency range—preferably at the higher end as this detunes the power gain into any Qi receiver and gives more consistent induced excitation levels. Thus a signal of 175 kHz could be used, which is the same as that used for Digital Ping, however a better frequency might be around 145 kHz due to European spectrum regulations. The RFID Ping is distinguished from a Digital Ping as being energy limited to field levels equivalent to 12 ampere-turns for example, and of a duration less than the minimum allowable unsuccessful Qi ping phase time of $t_{ping}+t_{expire}=65+90=155$ ms used when receiving a Digital Ping. This ensures that the RFID Ping won't cause the Qi receiver to proceed out of Ping phase and cause power transfer to start.

The transmitter may then perform a specific RFID detection method 2304 and/or other more general FOD methods. Knowing now that any NFC card/tag emulation function has been disabled in a Qi receivers, the RFID search will now not yield a "false positive" result since the embedded NFC emulation function will not respond the NFC REQA signal etc. Otherwise such a response if returned by an NFC emulation function would prevent the Qi receiver device from ever being charged by a Qi transmitter with such RFID protection.

Assuming no FO/RFID is found, the transmitter then continues to the Qi startup protocol which starts with a Digital Ping 2306, which is a continuous tone at typically 175 kHz and which will typically be at a higher power than the RFID Ping enabling powering up of receivers that do not have on-board batteries. Communication form the receiver to transmitter is then established in the normal way using load modulation of the tone.

Figure 24:
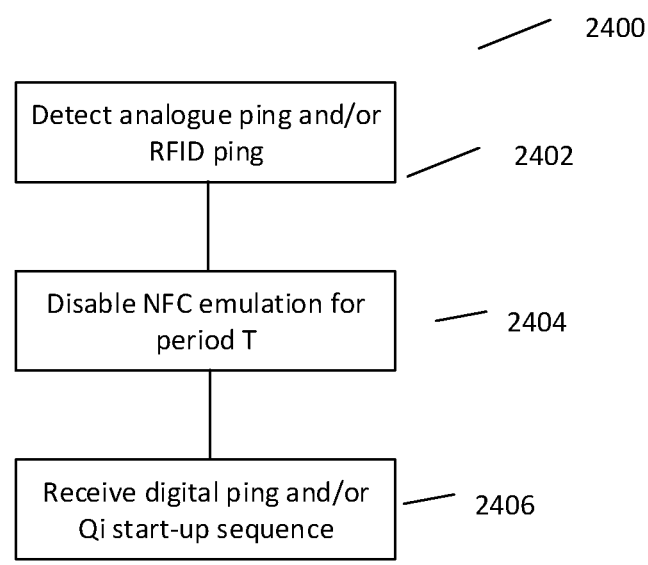
FIG. 24 is a flow diagram of a method of receiving signals from a transmitter to disable NFC emulation in a valid receiver.

The method 2400 employed by the receiver is shown in FIG. 24. If the receiver is a Smartphone or similar which has NFC emulation functionality (eg to emulate a loyalty card etc), and this function is ON it may confuse certain RFID detection methods and prevent power transfer to the phone. All other objects placed on the transmitter will be unaffected by this protocol.

The receiver monitors the coil for a RFID Ping 2402 (which as noted above could be the Analog Ping). The RFID Ping is essentially signalling the receiver to switch OFF its NFC emulation function. If the transmitter is not using RFID Ping and instead uses an existing Analog Ping such as impulse, it may still be possible for the receiver to detect this and declare that the transmitter is signalling to switch OFF its emulation function.

The receiver then switches off 2404 its NFC emulation function for a predetermined time (if it is ON). The predetermined time is sufficient to allow the transmitter to run the RFID detection method. 0.5 sec is the minimum required start-up time for a Qi transmitter to start power transfer with a receiver when placed, so would be a suitable period. If it hasn't started up within 0.5 sec, it most likely will not power it up at all (e.g. FOD inhibiting).

At the end of the time period, the Rx then follows the specified Qi startup protocol in response to receiving a Digital Ping from the Tx 2406.

Whilst embodiments have been described in which the object detection system uses excitation and receiver coils separate from the transmitter power coil, in alternative arrangements the object detection system may use one or more transmitter power coils, or a combination of power transmitter coils, excitation and receiver coils.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:
1. An inductive power transmitter comprising:
transmission circuitry having a coil, the transmission circuitry adapted to transmit wireless power to an inductive power receiver at a first frequency;
an inverter configured to drive the coil; and
control circuitry configured to:
control the inverter to cause the coil to produce a handshake signal at a second frequency that is higher than the first frequency;
responsive to receiving, via the coil, a response to the handshake signal from a non-authorised device proximate the coil, forgo transmission of the wireless power at the first frequency with the coil; and
responsive to not receiving, via the coil, a response to the handshake signal from a non-authorised device proximate the coil, transmit the wireless power at the first frequency with the coil.

2. The inductive power transmitter of claim 1 wherein the coil is neither an NFC reader coil nor an RFID tag reader coil.

3. The inductive power transmitter of claim wherein the transmission circuitry further comprises a tuning capacitor connected to the coil in series for tuning the transmission circuitry to the first frequency.

4. The inductive power transmitter of claim 1, wherein control circuitry is further configured to control the inverter to generate a first voltage to transmit the wireless power to the inductive power receiver at the first frequency and a second voltage to produce the handshake signal, the second voltage being higher than the first voltage.

5. The inductive power transmitter of claim 1, wherein the response from the non-authorised device includes data indicating the non-authorised device is an RFID device, wherein the control circuitry is configured to forgo transmission of the wireless power at the first frequency with the coil by forgoing transmission of the wireless power at the first frequency responsive to receiving the data.

6. The inductive power transmitter of claim 1, wherein the control circuitry is further configured to:
control the inverter to cause the coil to produce an object detection signal, wherein the transmission circuitry is configured to transmit the wireless power to the inductive power receiver at the first frequency by transmitting the wireless power to the inductive power receiver at the first frequency responsive to detecting an authorised device in proximity with the coil.

7. The inductive power transmitter of claim 6, wherein the object detection signal is at a third frequency that is different from the first frequency and the second frequency.

8. The inductive power transmitter of claim 7, wherein the first frequency is between 100-200 kHz for inductive power transfer, the second frequency is between 13-14 MHz, and the third frequency is between 1-2 MHz.

9. The inductive power transmitter of claim 8, wherein the transmission circuitry is configured to transmit the wireless power to the inductive power receiver at the first frequency by transmitting the wireless power to the inductive power receiver at the first frequency responsive to receiving a reply from an authorised device at a fourth frequency that is different from the first, second and third frequencies.

10. The inductive power transmitter of claim 9, wherein the fourth frequency is about 2 kHz.

11. The inductive power transmitter of claim 1, wherein the handshake signal comprises On-Off Keying, Amplitude Shift Keying, or Binary Phase Shift Keying modulation of the second frequency.

12. The inductive power transmitter of claim 1, wherein the control circuitry is configured to detect the response from the non-authorised device by detecting a fifth frequency.

13. The inductive power transmitter of claim 12, wherein the fifth frequency is substantially between 106-318 kHz, 424-480 kHz, or 847-848 kHz.

14. The inductive power transmitter of claim 1, wherein the non-authorised device is an RFID device.

15. The inductive power transmitter of claim 1, wherein the control circuitry is configured to control the inverter to drive the transmission circuitry at a sixth frequency prior to the second frequency, and to modulate the sixth frequency according to a signal in order to instruct an authorized receiver, having a non-authorised resonant device, to disable the non-authorised resonant device.

16. A method of operating an inductive power transmitter comprising transmission circuitry including a coil adapted to transmit wireless power to an inductive power receiver at a first frequency, the method comprising:
driving the transmission circuitry at a second frequency that is higher than the first frequency;
modulating the second frequency according to a handshake signal;
forgoing transmission of the wireless power at the first frequency with the coil when a response is received to the handshake signal from a non-authorised device proximate the coil; and
transmitting the wireless power at the first frequency with the coil when a response is not received to the handshake signal from a non-authorised device.

17. An inductive power transmitter comprising:
transmission circuitry having a power transmitting coil, wherein the transmission circuitry is adapted to transmit wireless power to an inductive power receiver at a first frequency;
an object detection coil configured to produce an object detection signal at a third frequency;
an inverter configured to drive the object detection coil; and
control circuitry configured to:
control the inverter to cause the object detection coil to produce a handshake signal at a second frequency that is higher than the third frequency;
responsive to receiving a response to the handshake signal from a proximate non-authorised device, forgo transmission of the wireless power at the first frequency with the power transmitting coil; and
responsive to not receiving a response to the handshake signal from a non-authorised device, transmit the wireless power at the first frequency with the power transmitting coil.

18. An inductive power transmitter comprising:
transmission circuitry having a coil, the transmission circuitry adapted to transmit wireless power to an inductive power receiver at a first frequency;
an inverter configured to drive the coil; and
control circuitry configured to:
control the inverter to drive the transmission circuitry at a sixth frequency prior to a second frequency, and to modulate the sixth frequency according to a predetermined signal in order to instruct an authorized receiver, having a non-authorised resonant device, to disable the non-authorised resonant device, the second frequency being modulated to provide a handshake signal to a non authorised device.

* * * * *